(12) United States Patent
Wang et al.

(10) Patent No.: US 12,121,859 B1
(45) Date of Patent: Oct. 22, 2024

(54) MODULAR MEMBRANE ISOLATION CARBON DESORPTION DEVICE, CARBON CAPTURE SYSTEM, METHOD AND APPLICATION

(71) Applicant: Central South University, Changsha (CN)

(72) Inventors: Changhong Wang, Changsha (CN); Xinbing Xia, Changsha (CN); Pengfei Zhao, Changsha (CN); Yibo Li, Changsha (CN); Hong Liu, Changsha (CN); Shuai Li, Changsha (CN); Kangkang Li, Changsha (CN); Shenghai Yang, Changsha (CN); Yongming Chen, Changsha (CN); Chaobo Tang, Changsha (CN); Jianguang Yang, Changsha (CN)

(73) Assignee: Central South University, Changsha (CN)

( * ) Notice: Subject to any disclaimer, the term of this patent is extended or adjusted under 35 U.S.C. 154(b) by 0 days.

(21) Appl. No.: 18/770,527

(22) Filed: Jul. 11, 2024

(30) Foreign Application Priority Data

Mar. 15, 2024 (CN) .......................... 202410300870.4

(51) Int. Cl.
  *B01D 53/96* (2006.01)
  *B01D 53/14* (2006.01)
  (Continued)

(52) U.S. Cl.
  CPC ....... *B01D 53/965* (2013.01); *B01D 53/1425* (2013.01); *B01D 53/1475* (2013.01);
  (Continued)

(58) Field of Classification Search
  CPC .............. B01D 53/965; B01D 53/1425; B01D 53/1475; B01D 53/18; B01D 53/62;
  (Continued)

(56) References Cited

FOREIGN PATENT DOCUMENTS

| CN | 206232826 U | 6/2017 |
| CN | 110813047 A | 2/2020 |
| CN | 115845566 A | 3/2023 |

OTHER PUBLICATIONS

CN 206232826 U—English translation (Year: 2017).*
CN 115845566 A—English translation (Year: 2023).*

* cited by examiner

*Primary Examiner* — Anita Nassiri-Motlagh
(74) *Attorney, Agent, or Firm* — Nitin Kaushik

(57) ABSTRACT

The present application provides a modular membrane isolation carbon desorption device, a carbon capture system, a method, and an application thereof. The device comprises an electrolyzer in which a plurality of anion exchange membranes are arranged, dividing the electrolyzer into multiple electrolysis units. Each electrolysis unit is equipped with electrodes, and the polarities of the electrodes in adjacent units are opposite. An electrolysis unit containing a positive electrode function as an anode electrolysis unit, while one with a negative electrode serves as a cathode electrolysis unit. This application effectively reduces heat loss during the carbon desorption process and enables dual-sided dissolution of the positive electrode and dual-sided deposition of the negative electrode, thereby enhancing electrolysis efficiency during the carbon desorption process.

21 Claims, 13 Drawing Sheets

(51) Int. Cl.
 *B01D 53/18* (2006.01)
 *B01D 53/62* (2006.01)
 *B01D 53/78* (2006.01)
(52) U.S. Cl.
 CPC ............. *B01D 53/18* (2013.01); *B01D 53/62* (2013.01); *B01D 53/78* (2013.01); *B01D 2252/2041* (2013.01); *B01D 2252/20421* (2013.01); *B01D 2257/504* (2013.01)
(58) Field of Classification Search
 CPC ............ B01D 53/78; B01D 2252/2041; B01D 2252/20421; B01D 2252/504
 USPC ........................................................ 423/228
 See application file for complete search history.

(a) (b)

MODULAR MEMBRANE ISOLATION CARBON DESORPTION DEVICE, CARBON CAPTURE SYSTEM, METHOD AND APPLICATION

CROSS-REFERENCE TO RELATED APPLICATIONS

The application claims priority to Chinese patent application No. 2024103008704, filed on Mar. 15, 2024, the entire contents of which are incorporated herein by reference.

TECHNICAL FIELD

The subject matter herein generally relates to a carbon dioxide ($CO_2$) recovery field, and specifically relates to a modular membrane isolation carbon desorption device, a carbon capture system, a method and an application thereof.

BACKGROUND

In order to achieve continuous carbon capture of $CO_2$ in flue gas, a Chinese invention patent (Authorization Announcement No. CN113578025B) discloses a method and system for capturing $CO_2$ from flue gas, comprising following steps: transferring flue gas containing $CO_2$ to an absorption device for absorbing $CO_2$ to obtain absorption liquid and purified gas; transferring the absorption liquid to an anode electrolysis unit of an electrolytic desorption device for desorption to obtain a gas-liquid mixture, wherein the gas-liquid mixture contains a metal/ammonia coordination compound and $CO_2$; performing a gas-liquid separation processing on the gas-liquid mixture to obtain $CO_2$ gas and separation liquid; transferring the separation liquid to a cathode electrolysis unit of the electrolytic desorption device, causing the separation liquid to undergo electrodeposition in the cathode electrolysis unit to obtain deposited metal and ammonia-containing solution; transferring the ammonia-containing solution to the absorption device for absorbing $CO_2$ again.

In order to achieve intermittent carbon capture from flue gas, a Chinese invention patent application (Publication No. CN115970447A) discloses a carbon desorption method, comprising: performing a first electrolysis on liquids in a first and a second chambers, wherein the liquid in the first chamber comprising either a $CO_2$-rich or a $CO_2$-lean liquid, and the liquid in the second chamber comprises the other of the $CO_2$-rich liquid and the $CO_2$-lean liquid; adjusting the liquid in the first chamber and/or the second chamber; performing a second electrolysis on the liquid in the first chamber and the liquid in the second chamber, wherein the liquid in the first chamber comprises one of the $CO_2$-rich liquid and a $CO_2$-lean liquid, and the liquid in the second chamber comprises the other of the $CO_2$-rich liquid and the $CO_2$-lean liquid; during the first electrolysis process and the second electrolysis, confining the liquid in the first chamber and the second chamber in their respective chambers.

Although the above-mentioned prior art can achieve $CO_2$ capture in a continuous or intermittent manner, the Chinese invention patent with the Authorization Announcement No. CN113578025B does not disclose how to improve an electrolysis efficiency in a carbon desorption process by arranging the carbon desorption device (electrolytic desorption device). Although the Chinese invention patent application with the Publication No. CN115970447A discloses multiple carbon desorption devices (referring to attached drawings of corresponding specification), it also does not specify how to improve the electrolysis efficiency in the carbon desorption process by arranging the carbon desorption devices.

Therefore, there is a need to provide a modular membrane isolation carbon desorption device, carbon capture system, method and application to resolve or at least mitigate a technical shortcoming identified in the aforementioned prior art. The technical defect is not clear how to improve the electrolysis efficiency by arranging the carbon desorption device.

SUMMARY

A main purpose of the present application is to provide a modular carbon desorption device and a carbon capture system, aiming to solve a technical challenge in the above-mentioned prior art, which is not clear how to improve the electrolysis efficiency by arranging the carbon desorption device.

To achieve the above object, the present application provides a modular membrane isolation carbon desorption device, which comprises an electrolyzer, which comprises a bottom wall, first and second side walls, with the latter two being positioned opposite each other;

the electrolyzer contains a number of anion exchange membranes, each sealed and connected to the bottom wall, as well as to the first and second side walls; the electrolyzer is divided into a number of electrolysis units by the number of anion exchange membranes;

each of the number of electrolysis units contains electrodes, and the polarities of the electrodes in adjacent electrolysis units are opposite; and one of the number of electrolysis units with a positive electrode is an anode electrolysis unit, and one of the number of electrolysis units with a negative electrode is a cathode electrolysis unit.

Furthermore, oriented along the arrangement of the plurality of anion exchange membranes, both the first and last electrolysis units within the electrolyzer function as cathode electrolysis units.

Furthermore, the anode electrolysis unit comprises an anode liquid inlet and an anode liquid outlet, and the cathode electrolysis unit comprises a cathode liquid inlet and a cathode liquid outlet;

each anode and cathode electrolysis unit is equipped with its own bottom liquid outlet;

a top of the electrolyzer is equipped with a cover, and the number of anion exchange membrane are sealed and connected to the cover;

the anode electrolysis unit is equipped with an exhaust hole, positioned above the levels of both the anode liquid inlet and outlet.

Furthermore, the modular membrane isolation carbon desorption device further comprises a $CO_2$-lean liquid transfer tank;

the $CO_2$-lean liquid transfer tank's liquid inlet is connected to the anode liquid outlet, and/or to the bottom liquid outlet of the anode electrolysis unit; and a liquid outlet end of the $CO_2$-lean liquid transfer tank is connected to the cathode liquid inlet.

Furthermore, the modular membrane isolation carbon desorption device further comprises an anode liquid circulation tank and a cathode liquid circulation tank;

a liquid inlet end of the anode liquid circulation tank is connected to the anode liquid outlet, and a first liquid outlet end of the anode liquid circulation tank is connected to the anode liquid inlet, and a second liquid outlet end of the anode liquid circulation tank is connected to the first liquid inlet end of the cathode liquid circulation tank, and a liquid outlet end of the cathode liquid circulation tank is connected to the cathode liquid inlet, and a second liquid inlet end of the cathode liquid circulation tank is connected to the cathode liquid outlet.

Furthermore, the modular membrane isolation carbon desorption device further comprises a liquid channel assembly; and the liquid channel assembly comprises a liquid inlet pipeline of the anode electrolysis unit, a liquid outlet pipeline of the anode electrolysis unit, a liquid inlet pipeline of the cathode electrolysis unit and a liquid outlet pipeline of the cathode electrolysis unit;

the anode liquid inlet and the anode liquid outlet are connected to the respective inlet and outlet pipelines of the anode electrolysis unit, while the cathode liquid inlet and cathode liquid outlet are similarly connected to their respective pipelines in the cathode electrolysis unit.

Furthermore, the anode liquid inlet is located at a lower part of the anode electrolysis unit, and the cathode liquid inlet is located at a lower part of the cathode electrolysis unit;

the anode liquid outlet is located at an upper part of the anode electrolysis unit, and the cathode liquid outlet is located at an upper part of the cathode electrolysis unit.

Furthermore, both the anode liquid inlet and the anode liquid outlet are located at an upper part of the anode electrolysis unit, and both the cathode liquid inlet and the cathode liquid outlet are located at an upper part of the cathode electrolysis unit.

Furthermore, both the anode liquid inlet and the cathode liquid inlet are located on the first side wall, and both the anode liquid outlet and the cathode liquid outlet are located on the second side wall;

the electrolyzer further comprises a third and a fourth side walls, positioned opposite each other, with an overflow baffle installed within the assembly;

the overflow baffle is located between the first and the second side wall, with one side of the overflow baffle extending to the third side wall and the other side extending to the fourth side wall; a liquid flow gap is formed between the overflow baffle and the bottom wall; the top of the overflow baffle is positioned above the levels of both the anode liquid inlet and cathode liquid inlet;

one side of each anion exchange membrane is sealed with the overflow baffle, and the other side is sealed with the first side wall;

the electrolyzer further incorporates an overflow chamber partition plate corresponding to the anion exchange membrane, and the anion exchange membrane is sealed and connected to the second side wall by the overflow chamber partition plate, thereby forming an overflow chamber in each of the electrolysis units; an upper end of the overflow chamber partition plate is sealed and connected to the cover, and a lower end of the overflow chamber partition plate is sealed and connected to the bottom wall.

The present application also provides a carbon capture system, comprising a carbon absorption device and a previously described modular membrane isolation carbon desorption device.

Furthermore, the carbon capture system further comprises a $CO_2$-rich liquid transfer tank and an absorbent solution transfer tank; a liquid inlet end of the $CO_2$-rich liquid transfer tank is connected to a liquid outlet end of the carbon absorption device, and a liquid outlet end of the $CO_2$-rich liquid transfer tank is connected to a $CO_2$-rich liquid receiving port of the modular membrane isolation carbon desorption device;

a liquid inlet end of the absorbent solution transfer tank is connected to an outlet of the absorbent solution in the modular membrane isolation carbon desorption device, and a liquid outlet end of the transfer tank for the absorbent solution is connected to a liquid inlet end of a carbon absorption device.

This application further extends to the utilization of any described modular membrane isolation carbon desorption device or carbon capture system for the capture of $CO_2$.

The present application further provides an intermittent carbon capture method, comprising:

absorbing $CO_2$ gas by an absorbent solution to obtain a $CO_2$-rich liquid, wherein the absorbent solution contains a carbon absorbent, and the $CO_2$-rich liquid containing the $CO_2$ combined with the carbon absorbent;

performing a desorption operation on the $CO_2$-rich liquid by a modular membrane isolation carbon desorption device, wherein the desorption operation comprises at least one electrolysis operation, wherein the electrolysis operation comprises:

transferring the $CO_2$-rich liquid to an anode electrolysis unit, and transferring a $CO_2$-lean liquid to a cathode electrolysis unit, wherein the $CO_2$-lean liquid contains coordination compounds formed by the carbon absorbent and metal ions; performing a first electrolysis operation on the anode electrolysis unit and the cathode electrolysis unit, after which the $CO_2$-rich liquid in the anode electrolysis unit is converted into a $CO_2$-lean liquid and the $CO_2$ gas, and the $CO_2$-lean liquid in the cathode electrolysis unit is converted into the absorbent solution;

after completing the first electrolysis operation, discharging the $CO_2$-lean liquid in the anode electrolysis unit and the absorbent solution in the cathode electrolysis unit;

transferring the $CO_2$-lean liquid from the anode electrolysis unit to the cathode electrolysis unit, and transferring the $CO_2$-rich liquid to the anode electrolysis unit, wherein a second electrolysis operation is performed on the anode electrolysis unit and the cathode electrolysis unit, wherein after the second electrolysis operation, the $CO_2$-rich liquid in the anode electrolysis unit is converted into the $CO_2$-lean liquid and the $CO_2$ gas, and the $CO_2$-lean liquid in the cathode electrolysis unit is converted into the absorbent solution;

after completing the second electrolysis operation, discharging the $CO_2$-lean liquid in the anode electrolysis unit and the absorbent solution in the cathode electrolysis unit.

The present application further provides a continuous fluidized carbon capture method, comprising:

absorbing $CO_2$ gas by an absorbent solution to obtain a $CO_2$-rich liquid, wherein the absorbent solution contains a carbon absorbent and the $CO_2$-rich liquid contains compounds formed by $CO_2$ and the carbon absorbent;

performing a desorption operation on the $CO_2$-rich liquid by the modular membrane isolation carbon desorption device, wherein the desorption operation comprises:

continuously transferring the $CO_2$-rich liquid to an anode electrolysis unit for anode electrolysis, and converting the $CO_2$-rich liquid to a $CO_2$-lean liquid in the anode electrolysis unit and releasing the $CO_2$ gas, wherein the $CO_2$-lean liquid contains coordination compounds formed by the carbon absorbent and metal ions; during an anode electrolysis process, continuously transferring the $CO_2$-lean liquid generated in the anode electrolysis unit to the cathode electrolysis unit for cathode electrolysis, wherein the $CO_2$-lean liquid electrodeposited in the cathode electrolysis unit is converted into the absorbent solution.

The present application further provides a fluidized intermittent carbon capture method, comprising:

absorbing $CO_2$ gas by an absorbent solution to obtain a $CO_2$-rich liquid, wherein the absorbent solution contains a carbon absorbent, and the $CO_2$-rich liquid contains compounds formed by $CO_2$ and the carbon absorbent;

performing a desorption operation on the $CO_2$-rich liquid by the modular membrane isolation carbon desorption device, wherein the desorption operation comprises a cyclic electrolysis operation and a liquid replacement operation;

the cyclic electrolysis operation comprising: continuously transferring the $CO_2$-rich liquid from an anode liquid circulation tank to an anode electrolysis unit for anode electrolysis to convert the $CO_2$-rich liquid into a $CO_2$-lean liquid and release $CO_2$ gas, with the $CO_2$-lean liquid containing coordination compounds formed by the carbon absorbent and metal ions; during an anode electrolysis process, refluxing the liquid in the anode electrolysis unit to the anode liquid circulation tank, and continuously transferring the liquid in anode liquid circulation tank to the anode electrolysis unit, converting the $CO_2$-rich liquid in the anode electrolysis unit to the $CO_2$-lean liquid;

continuously transferring the $CO_2$-lean liquid from a cathode liquid circulation tank to a cathode electrolysis unit for cathode electrolysis to achieve electrodeposition of metal ions and convert the $CO_2$-lean liquid into the absorbent solution; during a cathode electrolysis process, refluxing the liquid from the cathode electrolysis unit to the cathode liquid circulation tank and continuously conveying it to the cathode electrolysis unit, thereby completely converting the $CO_2$-lean liquid into the absorbent solution;

the liquid replacement operation comprising: after completing the cyclic electrolysis operation, discharging the absorbent solution produced in the cathode liquid circulation tank; transferring the $CO_2$-lean liquid produced in the anode liquid circulation tank to the cathode liquid circulation tank; and injecting the $CO_2$-rich liquid into the anode liquid circulation tank.

Compared with the prior art, the present application has at least the following advantages.

The present application can reduce heat loss during the carbon desorption process and can realize dual-sided dissolution of the positive electrode and dual-sided deposition of the negative electrode, thereby improving electrolysis efficiency and $CO_2$ capture efficiency during the carbon desorption process. On the one hand, the present application combines multiple anode electrolysis units and cathode electrolysis units into the same electrolyzer, while ensuring normal carbon desorption, reducing heat dissipation area, and minimizing heat loss of solution; and a temperature difference can be compensated in the same electrolyzer to stabilize temperature changes. On the other hand, the electrolyzer of the present application is not separated by an insulating partition, but directly separated by an anion exchange membrane, and an alternating arrangement of the positive and negative electrodes is used to achieve dual-sided dissolution and dual-sided deposition. Compared with the electrolyzer separated by the insulating partition, the desorption efficiency of $CO_2$ and the regeneration efficiency of the carbon absorbent under equal volume conditions are greatly improved (theoretically, it can be nearly doubled).

The present application can also significantly improve the uniformity of electrodeposition during the carbon desorption process. Additionally, the present application adopts a modular arrangement, which can reduce the space occupied by the carbon desorption device. Since no insulating partition is provided in the electrolyzer of the present application, but an ion exchange membrane is directly used to isolate each chamber, the present application also greatly reduces the consumption of insulating plates. At the same time, due to the reduction of consumables, the present application also reduces the cost of the electrolyzer. Due to the increase in electrolysis efficiency, the present application also reduces the time cost, and can significantly reduce the investment cost for a certain processing volume.

BRIEF DESCRIPTION OF DRAWINGS

In order to more clearly illustrate embodiments of the present application or the technical solutions in the prior art, the drawings to be used in the description of the embodiments or prior art are briefly introduced as follows. Obviously, the drawings described below are only some embodiments of the present application. For ordinary technicians in this field, other drawings can be obtained based on the structures shown in these drawings without the need for any creative work.

Figure 1:
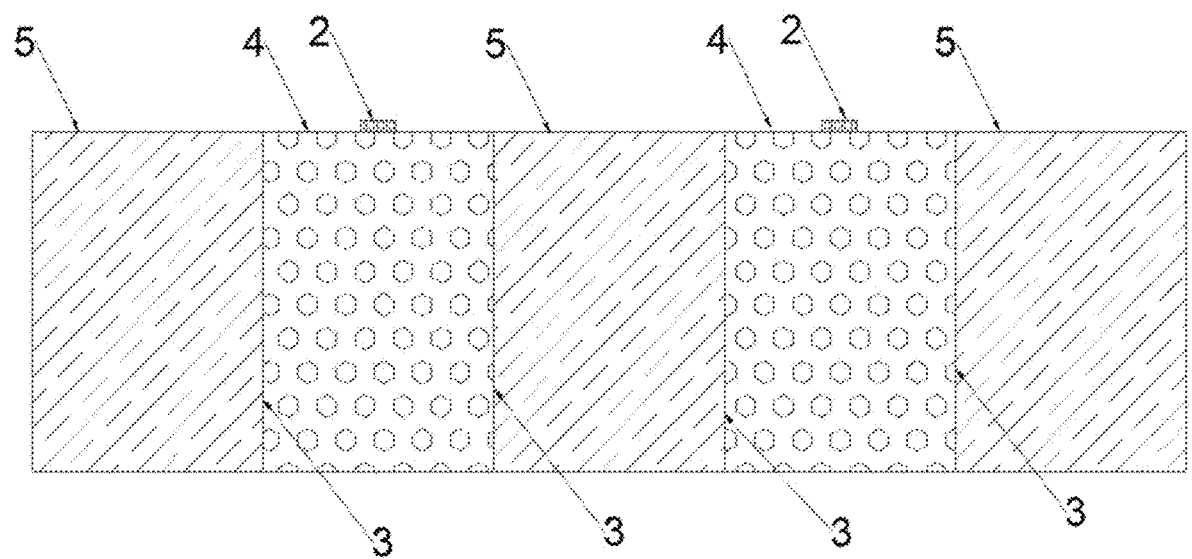
FIG. 1 is a schematic diagram of modules of a carbon desorption device in the present application.
Figure 2:
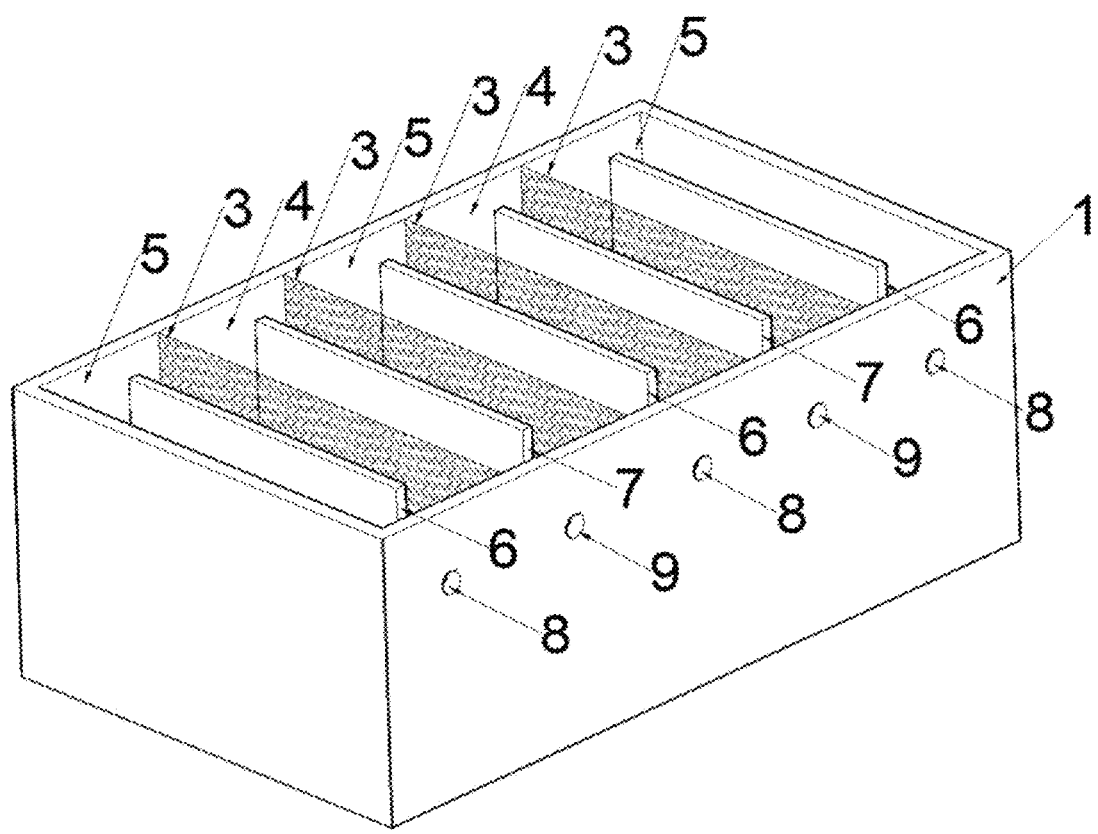
FIG. 2 is a schematic structural diagram of a carbon desorption device featuring a bottom-in and top-out configuration at a certain viewing angle of the present application.
Figure 3:
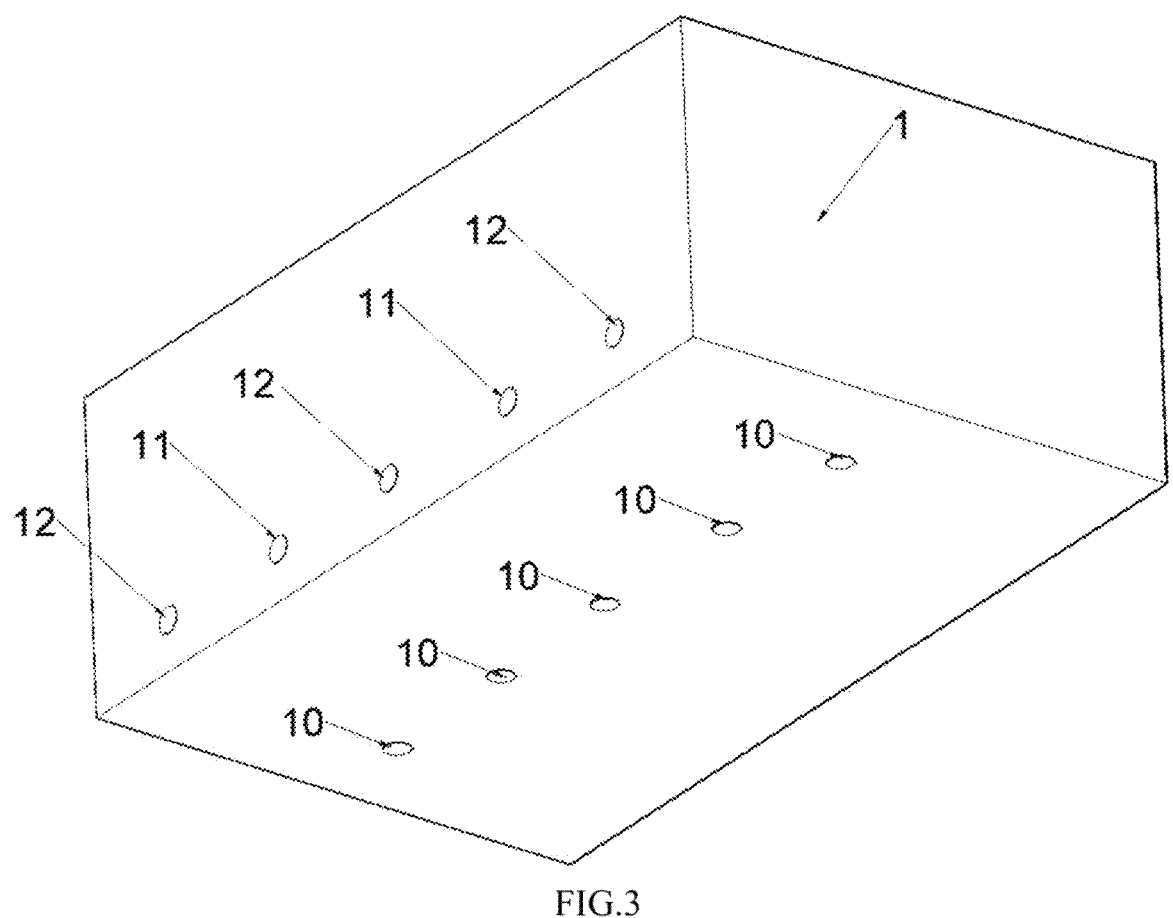
FIG. 3 is a schematic structural diagram of the carbon desorption device featuring the bottom-in and top-out configuration at another viewing angle of the present application.
Figure 4:
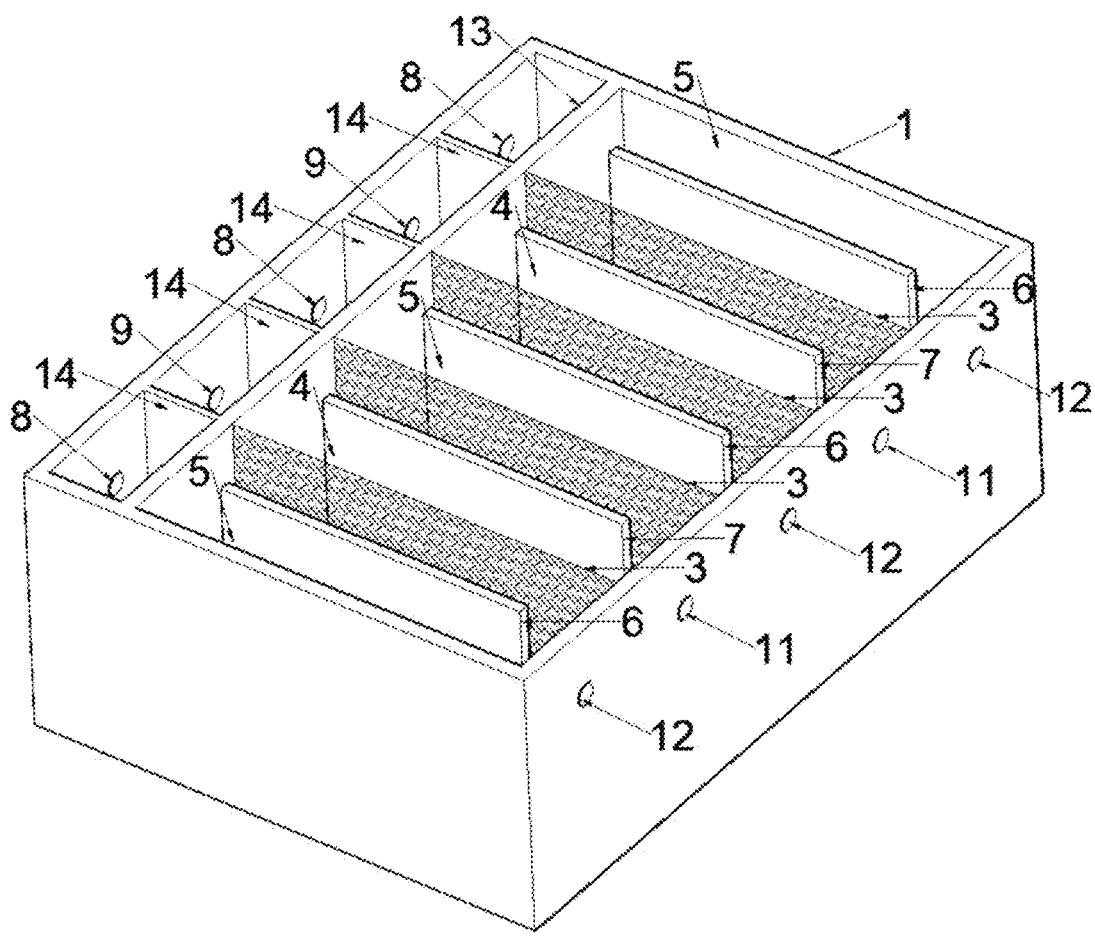
FIG. 4 is a schematic structural diagram of a carbon desorption device featuring a top-in and bottom-out configuration at a certain viewing angle of the present application.
Figure 5:
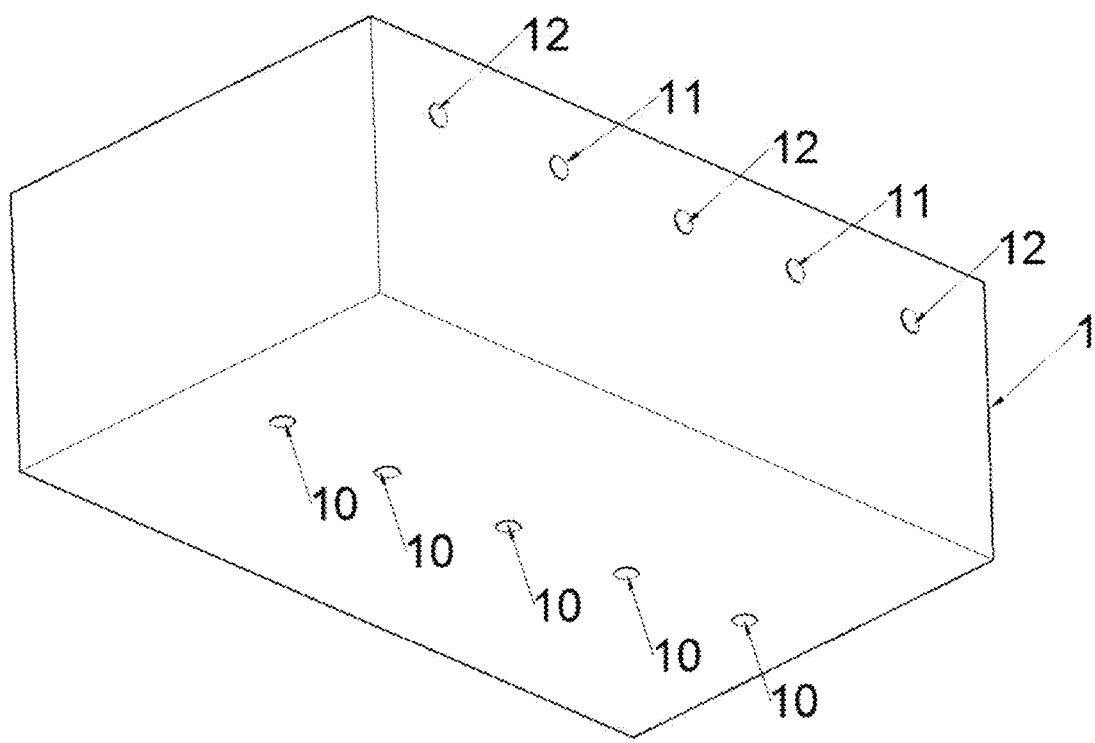
FIG. 5 is a schematic structural diagram of the carbon desorption device featuring the top-in and bottom-out configuration at another viewing angle of the present application.
Figure 6:
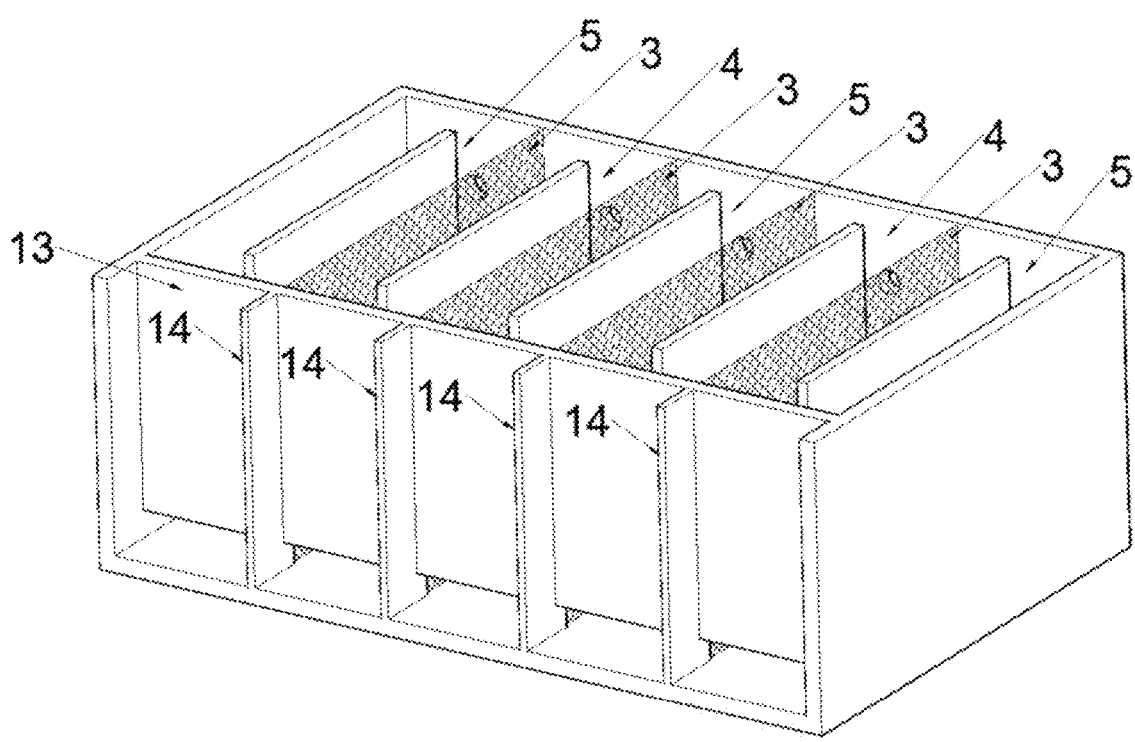
FIG. 6 is a partial cross-sectional view of the carbon desorption device featuring the top-in and bottom-out configuration according to the present application.
Figure 7:
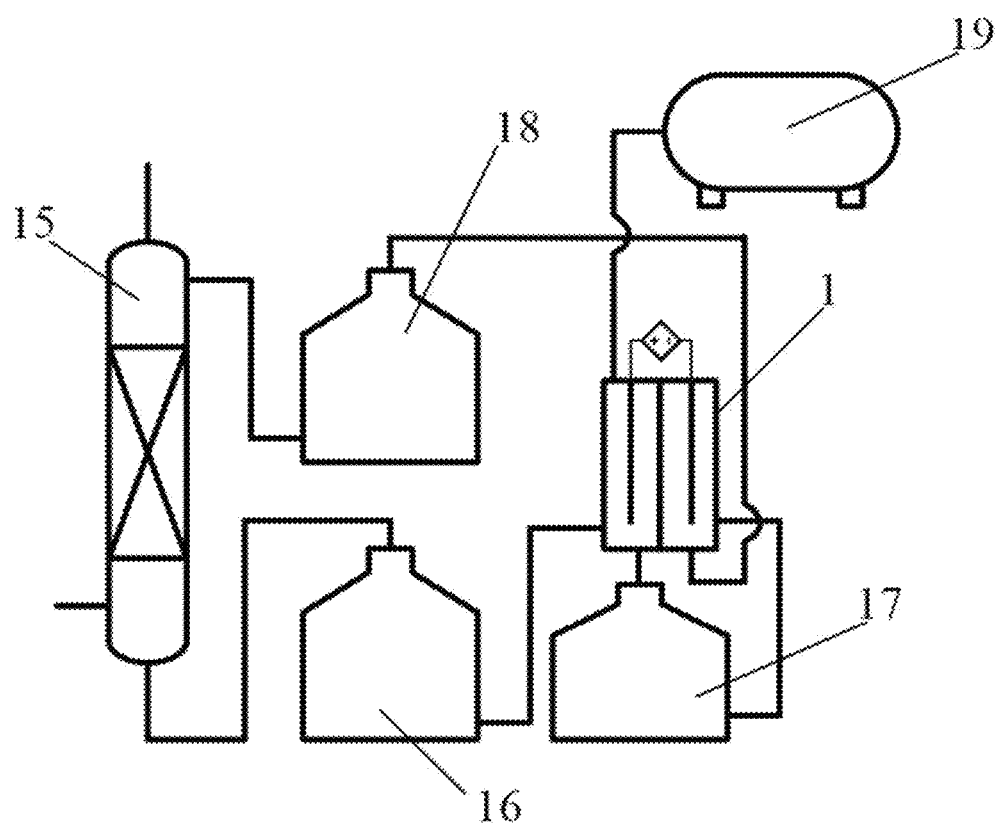
FIG. 7 is a schematic structural diagram of a carbon capture system with a $CO_2$-lean liquid transfer tank according to the present application.
Figure 8:
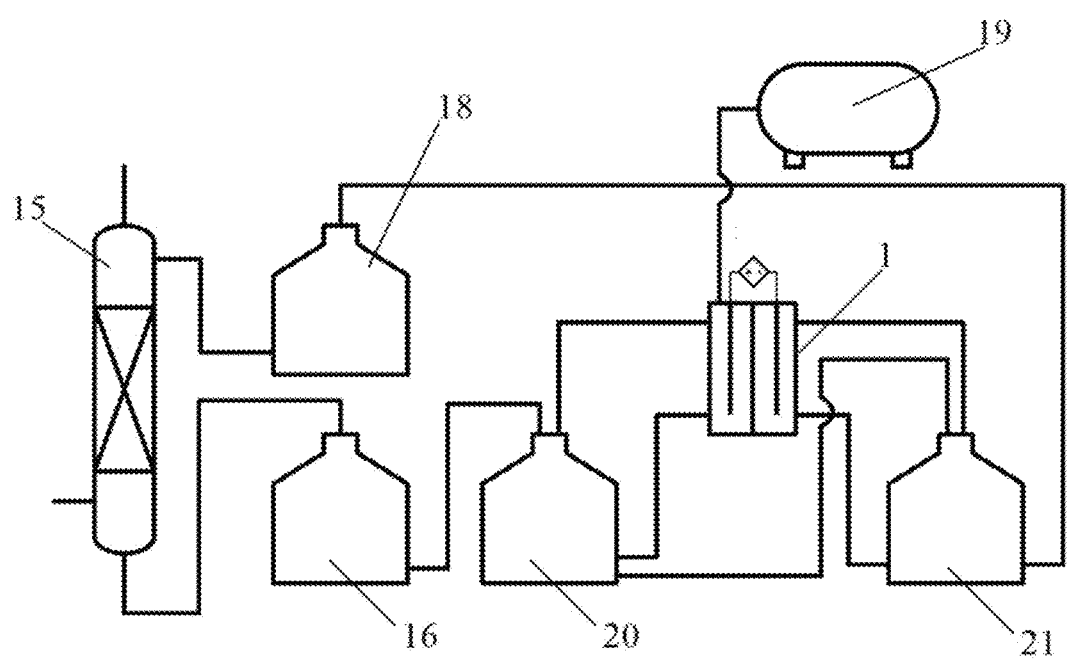
FIG. 8 is a schematic structural diagram of a carbon capture system with a circulation tank according to the present application.

1, electrolyzer; 2, exhaust hole; 3, anion exchange membrane; 4, anode electrolysis unit; 5, cathode electrolysis unit; 6, negative electrode; 7, positive electrode; 8, cathode liquid outlet; 9, anode liquid outlet; 10, bottom liquid outlet; 11, anode liquid inlet; 12, cathode liquid inlet; 13, overflow baffle; 14, overflow chamber partition plate; 15, carbon absorption device; 16, $CO_2$-rich liquid transfer tank; 17, $CO_2$-lean liquid transfer tank; 18, absorbent solution transfer tank; 19, gas collection tank; 20, anode liquid circulation tank; 21, cathode liquid circulation tank.

The realization of purpose, functional features, and advantages of the present application will be further explained in conjunction with the embodiments and with reference to the accompanying drawings.

DETAILED DESCRIPTION OF THE EMBODIMENTS

The following descriptions, in conjunction with the accompanying drawings, detail the technical solutions embodied in the application. Obviously, the described embodiments are only part of the embodiments of the present application, not all of them. Based on the embodiments of the present application, all other embodiments obtained by ordinary technicians in the field without creative work are within the protection scope of the present application.

Furthermore, the technical solutions between the various embodiments of the present application may be combined with each other, but the technical solutions must be based on a fact that they can be implemented by ordinary technicians in the field. When a combination of technical solutions is mutually contradictory or cannot be implemented, it should be deemed that such a combination of technical solutions does not exist and is not within the protection scope required by the present application.

In addition, in the present application, the descriptions of "first", "second", etc. are only used for descriptive purposes and cannot be understood as indicating or implying relative importance or implicitly indicating the number and order of the indicated technical features. Therefore, the features defined as "first" or "second" may explicitly or implicitly comprise at least one of the features. Additionally, in the present application, the description of the first side and the second side of the electrode is only used to distinguish the two sides of the electrode.

The "carbon capture" involved in the present application comprises carbon absorption and carbon desorption. Carbon absorption means that $CO_2$ is absorbed by an absorbent solution (containing a carbon absorbent) in the carbon absorption device 15 to generate a $CO_2$-rich liquid (a liquid that mainly contains compounds formed by the coordination of the carbon absorbent and $CO_2$). Carbon desorption means that the $CO_2$-rich liquid undergoes an electrolytic desorption reaction in the anode electrolysis unit 4 of the carbon desorption device, thereby releasing $CO_2$ in the anode electrolysis unit 4 and converting it into a $CO_2$-lean liquid (a liquid that mainly contains compounds formed by the coordination of the carbon absorbent and metal ions); simultaneously, the $CO_2$-lean liquid, which may be derived from the electrolysis before the anode electrolysis unit 4, undergoes an electrodeposition reaction in the cathode electrolysis unit 5 to obtain an absorbent solution. The term "carbon" involved in the present application specifically refers to $CO_2$. In the present application, the carbon absorbent is a substance that can be coordinated and combined with $CO_2$, and the substance can be separated from $CO_2$ during an anode electrolysis process; the carbon absorbent comprises one or more of inorganic ammonia ($NH_3$) and organic amine; the absorbent solution is a solution containing a carbon absorbent. Since the present application involves liquid transportation, in order to achieve this, those skilled in the art can selectively define corresponding pipelines and comprise a delivery pump in the corresponding pipelines.

It should be pointed out that, taking the Chinese invention patent application with publication number CN115970447A as an example, each carbon desorption device tank is relatively independent, which not only increases the site area but also causes heat loss in the $CO_2$ desorption process to be faster, resulting in a decrease in the electrolysis efficiency of $CO_2$ desorption and affecting the capture of $CO_2$. Additionally, when the carbon desorption device is intermittently operated, the electrode reaction is limited by concentration polarization, leading to a low rate, high overpotential, and high energy consumption. It is usually necessary to configure a pipeline for solution circulation in each chamber, but a circulation process of the solution will accelerate heat dissipation, thereby resulting in a decrease in the electrolysis efficiency in the $CO_2$ desorption process.

Research indicates that introducing multiple insulating partitions within a single electrolyzer can enhance the efficiency of the carbon desorption process, and that dividing the single electrolyzer into multiple electrolytic components with anode chambers and cathode chambers using insulating partitions can solve problems of heat dissipation and site occupation. However, further research by the applicant found that although the use of insulating partitions can modularize the carbon desorption device, it can only perform a single-sided dissolution of the electrode in the anode chamber and a single-sided electrodeposition of the electrode in the cathode chamber.

Referring to FIG. 1-FIG. 8, the present application provides a modular membrane isolation carbon desorption device, which comprises an electrolyzer 1. In the embodiment, the electrolyzer 1 comprises a bottom wall, a first side wall and a second side wall, and the first side wall and the second side wall are positioned opposite each other and can specifically be two side walls symmetrically arranged along a length direction of the electrolyzer 1.

The electrolyzer 1 is equipped with a number of anion exchange membranes 3, and each of the anion exchange membranes 3 is sealed and connected to the bottom wall, the first and second side walls. At the same time, the electrolyzer 1 is divided into a number of electrolysis units by the anion exchange membranes 3, wherein the anion exchange membranes 3 and the electrolysis units can be arranged in sequence along the length direction of the electrolyzer 1, and each electrolysis unit can have the same volume. The sealed connection of the anion exchange membranes 3 can be directly connected or indirectly connected to ensure that there is no gap for liquid flow between the anion exchange membrane 3 and the bottom wall, the first and second side walls. The electrolysis unit can be understood as a chamber for electrolysis, and this chamber can also be divided by an overflow baffle 13 to form an electrolytic chamber and an overflow chamber. The electrolysis unit is formed by surrounding a part of the inner wall of the electrolyzer 1 and the anion exchange membrane 3. When the electrolysis unit comprises the electrolytic chamber and the overflow chamber, which can also be formed by surrounding a part of the inner wall of the electrolyzer 1, the anion exchange membrane 3, and the overflow chamber partition plate 14.

It should be noted that in a conventional carbon desorption device, one or more mutually independent electrolyzers 1 are comprised, and the electrolyzer 1 is separated by only one anion exchange membrane 3 to form an anode chamber and a cathode chamber, resulting in low thermal efficiency, low electrolysis efficiency, and large floor space for conventional carbon desorption devices. More importantly, in the prior art, the anode chamber can only perform single-sided dissolution of the electrode, and the cathode chamber can only perform single-sided electrodeposition of the electrode.

The present application directly divides the electrolyzer 1 into a number of electrolysis units through the use of multiple anion exchange membranes 3, which can not only improve thermal efficiency and electrolytic efficiency and reduce space occupied, but also realize dual-sided dissolution of the electrode in the anode chamber and dual-sided electrodeposition of the electrode in the cathode chamber.

It should be pointed out that, in the independent electrolysis unit, since there is only one pair of electrode plates—namely the cathode plate and the anode plate—potential lines are basically distributed only between these two plates during electrolysis, resulting in dissolution and deposition on one side alone; in the present application, since the insulating partition is eliminated in the adjacent electrolysis units and an anion exchange membrane is used instead, opposite polar plates of the adjacent electrolysis units can also form one electrolysis unit, so there are corresponding electric fields on both sides of a middle plate, enabling dual-sided dissolution and dual-sided deposition; furthermore, the present application can also significantly improve the uniformity of electrodeposition.

It should also be pointed out that in the electrolyzer using the insulating partition, the electrolysis unit comprises one anode chamber and one cathode chamber, that is, there is only one pair of pole plates, and there is no potential line distribution on the pole plates between adjacent electrolysis units due to the presence of the insulating partition. At this time, due to the concentrated and even distribution of potential lines on the opposing sides of the anode and cathode, anode dissolution and cathode deposition primarily take place on their respective opposing sides.

However, since the same plate acting as an equipotential body, and a small amount of potential lines may even be generated from the edges of the anode and cathode plates to the other side (outer side), dissolution or deposition may occur, and due to the uneven distribution of potential lines on the edge and outside of the plate, uneven dissolution and deposition occur. Uneven dissolution and deposition make it easy for holes and spikes to appear on the surface of the electrode, that is, sites with different energies will occur, which will further lead to uneven dissolution and deposition, and further will promote each other and increase the power consumption of the electrolysis process and reduce the current efficiency. In independent electrolysis units, edge wrapping and adding an inert coating to the outer side of the electrode are usually adopted to avoid uneven dissolution and deposition. Additionally, in the electrochemical desorption system of $CO_2$, two metal plates will spontaneously undergo chemical corrosion in the electrolyte when no power is applied, which is also one of the reasons for uneven dissolution and deposition.

Figure 9:
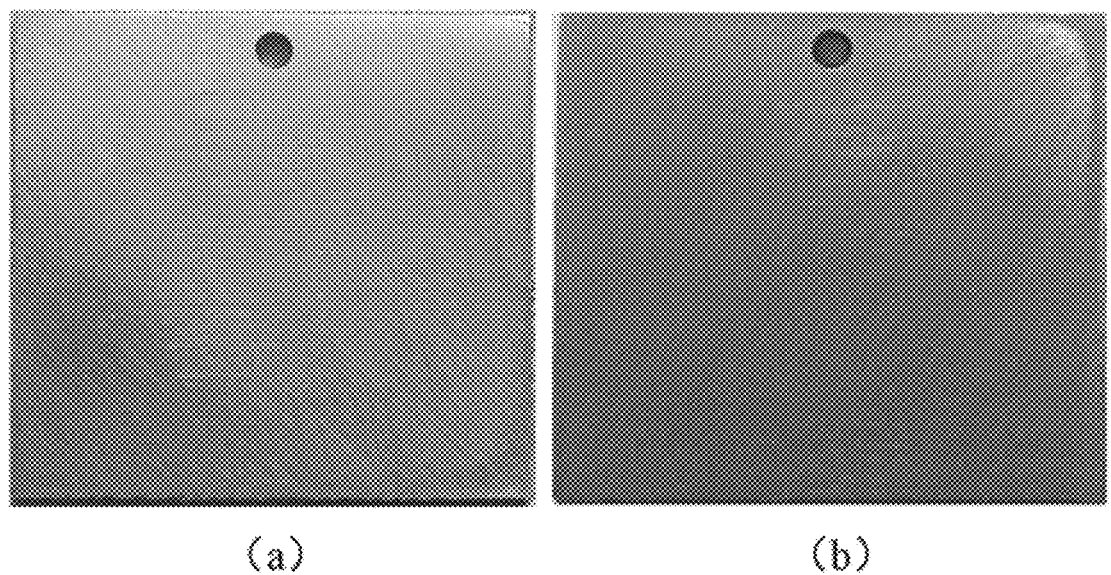
FIG. 9 is an initial state diagram of a zinc plate according to the present application, where (a) represents the first side and (b) represents the second side.

As an illustration of a specific arrangement of the present application, in order to ensure the carbon desorption, each of the electrolysis units is equipped with an electrode comprising a metal element (such as one or more of zinc, copper, nickel, and silver) that can coordinate and combine with the carbon absorbent. The electrode used in the embodiments and comparative embodiments of the present application is a zinc plate, as shown in its pre-electrolysis state in FIG. 9. The electrodes in each of the electrolysis units, which can have the same initial size, can be centrally installed in each chamber. The center distance of the anisotropic electrodes can be defined as 20 to 40 mm, while the distance between the plate sides and the tank's side wall, as well as the tank's bottom, can be defined as ranging from 20 to 70 mm.

To expand the electrode's effective area and ensure even potential distribution and uniform dissolution/deposition, adjacent electrolysis units are designed with opposing electrode polarities, that is, the positive electrodes 7 and the negative electrodes are arranged alternately. In the embodiment, the electrolysis unit containing the positive electrode 7 function as the anode electrolysis unit 4, whereas the electrolysis unit with the negative electrode 6 serves as the cathode electrolysis unit 5; both units can have equal volumes.

In order to improve the utilization rate of the anode and reduce a number of exhaust pipes, both the first and the last electrolysis unit in the electrolyzer 1, positioned along the arrangement direction of the anion exchange membrane 3, are cathode electrolysis units 5; this means that the electrolysis units at both ends of the electrolyzer 1 are the cathode electrolysis units 5.

To facilitate the inflow and outflow of liquid, the anode electrolysis unit 4 is equipped with an anode liquid inlet 11 and an anode liquid outlet 9. Similarly, the cathode electrolysis unit 5 is equipped with a cathode liquid inlet 12 and a cathode liquid outlet 8.

For continuous carbon capture considerations, to ensure an overflow of the liquid in the electrolysis unit, the anode liquid outlet 9 and the cathode liquid outlet 8 are located at an upper part of the electrolysis unit. Furthermore, both the anode electrolysis unit 4 and the cathode electrolysis unit 5 are equipped with a bottom liquid outlet 10 at their lower sections, facilitating a complete discharge of the liquid in the electrolysis unit and aiding intermittent carbon capture. In the embodiment, if only intermittent carbon capture is considered, the anode liquid outlet 9, the cathode liquid outlet 8 and the bottom liquid outlet 10 can also be the same opening.

To ensure an airtightness during the carbon desorption process, the top of the electrolyzer 1 is fitted with a cover, to which the anion exchange membrane 3 is sealed and connected. To ensure the collection of $CO_2$ gas, the anode electrolysis unit 4 also is equipped with an exhaust hole 2, positioned above the levels of both the anode liquid inlet 11 and the anode liquid outlet 9. In the embodiment, the cover is equipped with an exhaust hole 2 at corresponding position of each anode electrolysis unit 4. In another embodiment, to facilitate the replacement operation of the electrode plate or maintenance operation of the tank body, the exhaust hole 2 and its corresponding pipeline can be located at an upper part of the side wall of the anode electrolysis unit 4, positioned higher than the liquid level within the anode electrolysis unit 4. The carbon desorption device can also be equipped with a gas collection tank 19, which is connected to the exhaust hole 2 to facilitate the unified collection of gases.

To realize the same discharge and delivery of the liquids in the anode electrolysis unit 4 and the cathode electrolysis unit 5, and to ensure a delivery of the $CO_2$-lean liquid, the carbon desorption device also comprises a $CO_2$-lean liquid transfer tank 17. The liquid inlet end of the $CO_2$-lean liquid transfer tank 17 is connected to the anode liquid outlet 9, and/or the liquid inlet end of the $CO_2$-lean liquid transfer tank 17 is connected to the bottom liquid outlet 10 of the anode electrolysis unit 4. The liquid outlet end of the $CO_2$-lean liquid transfer tank 17 is connected to the cathode liquid inlet 12.

To realize fluidized intermittent carbon capture, the carbon desorption device further comprises an anode liquid circulation tank 20 and a cathode liquid circulation tank 21. By utilizing the anode liquid circulation tank 20 and the cathode liquid circulation tank 21, the processing capacity of the anode electrolysis unit 4 and the cathode electrolysis unit 5 can be expanded. This also promotes liquid flow within the electrolysis unit, reduces concentration polarization, improves current efficiency of the desorption process, and lowers the desorption energy consumption per unit of $CO_2$. The anode liquid circulation tank 20 and the cathode liquid circulation tank 21 can also ensure the same discharge and delivery of the solutions in each chamber.

In the embodiment, the liquid inlet end of the anode liquid circulation tank 20 is connected to the anode liquid outlet 9, and the first liquid outlet end of the anode liquid circulation tank 20 is connected to the anode liquid inlet 11, while the second liquid outlet end of the anode liquid circulation tank 20 is connected to the first liquid inlet end of the cathode liquid circulation tank 21. The liquid outlet end of the cathode liquid circulation tank 21 is connected to the cathode liquid inlet 12, and the second liquid inlet end of the cathode liquid circulation tank 21 is connected to the cathode liquid outlet 8.

To realize a unified liquid inlet and outlet of each of the anode electrolysis units 4 and each of the cathode electrolysis units 5 and ensure the same discharge and delivery of the liquid in each electrolysis unit, the carbon desorption device also comprises a liquid channel assembly. The liquid channel assembly comprises a liquid inlet pipeline and a liquid outlet pipeline for both the anode electrolysis unit 4 and the cathode electrolysis unit 5.

The anode liquid inlet 11 is connected to the liquid inlet pipeline of the anode electrolysis unit 4, while the anode liquid outlet 9 is connected to its liquid outlet pipeline. Similarly, the cathode liquid inlet 12 is connected to the liquid inlet pipeline of the cathode electrolysis unit 5, and the cathode liquid outlet 8 is connected to its liquid outlet pipeline.

To achieve a liquid inlet from a bottom and an overflow from a top in each electrolysis unit, the anode liquid inlet 11 is located at the lower part of the anode electrolysis unit 4, and the cathode liquid inlet 12 is located at the lower part of the cathode electrolysis unit 5. Similarly, the anode liquid outlet 9 is located at the upper part of the anode electrolysis unit 4, and the cathode liquid outlet 8 is located at the upper part of the cathode electrolysis unit 5. In order to extend a reaction path, both the anode liquid inlet 11 and the cathode liquid inlet 12 are located on the first side wall, while both the anode liquid outlet 9 and the cathode liquid outlet 8 are located on the second side wall.

To achieve a liquid inlet from the top and an overflow also from the top in each electrolysis unit, both the anode liquid inlet 11 and the anode liquid outlet 9 are located at the upper part of the anode electrolysis unit 4. Similarly, both the cathode liquid inlet 12 and the cathode liquid outlet 8 are located at the upper part of the cathode electrolysis unit 5.

Furthermore, to extend the reaction pathway, both the anode liquid inlet 11 and the cathode liquid inlet 12 are located on the first side wall, while both the anode liquid outlet 9 and the cathode liquid outlet 8 are located on the second side wall.

The electrolyzer 1 further has a third side wall and a fourth side wall, with the third and fourth side walls situated opposite each other, and an overflow baffle 13 is installed in the electrolyzer 1.

The overflow baffle 13 is located between the first side wall and the second side wall, and one side of the overflow plate 13 extends to the third side wall, while the other side extends to the fourth side wall; a gap for liquid flow exists between the overflow baffle 13 and the bottom wall; the top of the overflow baffle 13 is positioned above the levels of both the anode liquid inlet 11 and the cathode liquid inlet 12, and specifically can extend to the top of the electrolyzer 1, and be sealed and connected to the cover.

One side of each anion exchange membrane 3 is sealed with the overflow baffle 13, and the other side is sealed with the first side wall.

The electrolyzer 1 also is equipped with an overflow chamber partition plate 14 corresponding to the anion exchange membrane 3. The anion exchange membrane 3 is sealed and connected to the second side wall via the overflow chamber partition plate 14, thereby forming an overflow chamber in each of the electrolysis units. The upper end of the overflow chamber partition plate 14 is sealed and connected to the cover, and the lower end of the overflow chamber partition plate 14 is sealed and connected to the bottom wall.

The present application provides a carbon capture system comprising a carbon absorption device 15 and a previously described modular membrane isolation carbon desorption device.

To facilitate transfer of $CO_2$-rich liquid and absorbent solution, thereby enabling carbon capture operations, the system further comprises a $CO_2$-rich liquid transfer tank 16 and an absorbent solution transfer tank 18. The liquid inlet end of the $CO_2$-rich liquid transfer tank 16 is connected to the liquid outlet end of the carbon absorption device 15, and the liquid outlet end of the $CO_2$-rich liquid transfer tank 16 is connected to the $CO_2$-rich liquid receiving port of the modular membrane isolation carbon desorption device.

The absorbent solution transfer tank 18 has its inlet connected to the modular membrane isolation carbon desorption device's absorbent solution outlet, and its outlet connected to the carbon absorption device's inlet.

The present application also provides applications of any of the modular membrane isolation carbon desorption devices described above or any of the carbon capture systems described above in capturing $CO_2$.

As a specific form of the applications, the present application also provides an intermittent carbon capture method, which uses the absorbent solution to absorb the $CO_2$ gas to obtain a $CO_2$-rich liquid. The absorbent solution comprises a carbon absorbent, and the $CO_2$-rich liquid contains compounds formed by $CO_2$ and the carbon absorbent.

The $CO_2$-rich liquid is desorbed by using any of the modular membrane isolation carbon desorption devices described above, and a desorption process comprises at least one electrolysis operation, which comprises:

the $CO_2$-rich liquid is transferred to the anode electrolysis unit 4, and the $CO_2$-lean liquid is transferred to the cathode electrolysis unit 5, and the $CO_2$-lean liquid contains coordination compounds formed by the carbon absorbent and metal ions; the anode electrolysis unit 4 and the cathode electrolysis unit 5 are subjected to a first electrolysis; after the first electrolysis, the $CO_2$-rich liquid in the anode electrolysis unit 4 is converted into a $CO_2$-lean liquid and $CO_2$ gas, and the $CO_2$-lean liquid in the cathode electrolysis unit 5 is converted into an absorbent solution.

Upon completion of the first electrolysis, the $CO_2$-lean liquid in the anode electrolysis unit 4 and the absorbent solution in the cathode electrolysis unit 5 are discharged.

The $CO_2$-lean liquid from the anode electrolysis unit 4 is moved to the cathode electrolysis unit 5, and the $CO_2$-rich liquid is moved to the anode electrolysis unit 4 for a second electrolysis; after the second electrolysis, the $CO_2$-rich liquid in the anode electrolysis unit 4 is converted into the $CO_2$-lean liquid and the $CO_2$ gas, and the $CO_2$-lean liquid in the cathode electrolysis unit 5 is converted into the absorbent solution.

After the second electrolysis is completed, both the $CO_2$-lean liquid in the anode electrolysis unit 4 and the absorbent solution in the cathode electrolysis unit 5 are discharged.

An imbalance between the discharge and inflow of the solution can result in differential pressure across the membrane, potentially leading to deformation and reduced membrane longevity, or even contact with the electrode plate. Therefore, when performing intermittent carbon capture, in the same electrolyzer, the same volume of solution is input at a same flow rate in each electrolysis unit, or the same volume of solution is discharged at the same flow rate simultaneously.

The present application further provides a continuous fluidized carbon capture method that employs an absorbent solution to sequester $CO_2$ gas, producing a $CO_2$-rich liquid. The absorbent solution comprises a carbon absorbent, and the $CO_2$-rich liquid contains compounds formed by $CO_2$ and the carbon absorbent.

The $CO_2$-rich liquid is desorbed by using any of the modular membrane isolation carbon desorption devices described above, and the desorption process of the $CO_2$-rich liquid comprises:

the $CO_2$-rich liquid is continuously transferred to the anode electrolysis unit 4 for anode electrolysis, so that the $CO_2$-rich liquid is converted into the $CO_2$-lean liquid in the anode electrolysis unit 4 and releases $CO_2$ gas, and the $CO_2$-lean liquid contains coordination compounds formed by the carbon absorbent and metal ions; during the anode electrolysis process, the $CO_2$-lean liquid generated in the anode electrolysis unit 4 is continuously transferred to the cathode electrolysis unit 5 for cathode electrolysis, so that the $CO_2$-lean liquid is electrodeposited in the cathode electrolysis unit 5 and converted into the absorbent solution.

The present application also provides a fluidized intermittent carbon capture method, which uses the absorbent solution to absorb the $CO_2$ gas to obtain the $CO_2$-rich liquid; the absorbent solution comprises the carbon absorbent, and the $CO_2$-rich liquid contains compounds formed by $CO_2$ and the carbon absorbent.

The $CO_2$-rich liquid is desorbed using any of the modular membrane isolation carbon desorption devices described above; the desorption process comprises a cyclic electrolysis operation and a liquid replacement operation.

The cyclic electrolysis operation comprises: continuously transferring the $CO_2$-rich liquid from the anode liquid circulation tank 20 to the anode electrolysis unit 4 for anode electrolysis to convert the $CO_2$-rich liquid into the $CO_2$-lean liquid and release the $CO_2$ gas, and the $CO_2$-lean liquid contains coordination compounds formed by the carbon absorbent and metal ions; during the anode electrolysis process, the liquid in the anode electrolysis unit 4 is returned to the anode liquid circulation tank 20 and continued to be transferred to the anode electrolysis unit 4 to completely convert the $CO_2$-rich liquid in the anode liquid circulation tank 20 into the $CO_2$-lean liquid.

The $CO_2$-lean liquid is continuously transferred from the cathode liquid circulation tank 21 to the cathode electrolysis unit 5 for cathode electrolysis to achieve electrodeposition of metal ions and convert the $CO_2$-lean liquid into the absorbent solution. During the cathode electrolysis process, the liquid in the cathode electrolysis unit 5 is refluxed to the cathode liquid circulation tank 21 and continues to be transferred to the cathode electrolysis unit 5 so that the $CO_2$-lean liquid in the cathode liquid circulation tank 21 is completely converted into the absorbent solution.

The liquid replacement operation comprises: after completing the cyclic electrolysis operation, discharging the absorbent liquid produced in the cathode liquid circulation tank 21; then, transferring the $CO_2$-lean liquid produced in the anode liquid circulation tank 20 to the cathode liquid circulation tank 21; and then, injecting the $CO_2$-rich liquid into the anode liquid circulation tank 20.

In the present application, when a continuous fluidized carbon capture or a fluidized intermittent carbon capture is carried out, in the same electrolyzer, equal volumes of solution are simultaneously input at the same flow rate into each electrolysis unit to perform operations such as tank filling, or equal volumes of solution are simultaneously discharged at the same flow rate to perform operations such as final drainage.

THE FOLLOWING ARE SPECIFIC EMBODIMENTS OF THE PRESENT APPLICATION

Embodiment 1: A Modular Membrane Isolation Carbon Desorption Device

In the embodiment, the carbon desorption device comprises an electrolyzer 1, which comprises a bottom wall, a first side wall, a second side wall, a third side wall, and a fourth side wall. The first and second side walls are positioned opposite one another, as are the third and fourth side walls.

The electrolyzer 1 is equipped with a number of anion exchange membranes 3 that are attached to and sealed against the bottom wall, the first side wall, and the second side wall, dividing the electrolyzer 1 into a number of electrolysis units.

Each electrolysis units contain electrodes, with adjacent units having electrodes of opposite polarities. In the embodiment, the electrolysis unit with the positive electrode 7 (the anode plate is a zinc plate) is the anode electrolysis unit 4, and the electrolysis unit with the negative electrode 6 (the cathode plate is a zinc plate) is the cathode electrolysis unit 5. Along the arrangement direction of the anion exchange membrane 3, both a first electrolysis unit and a last electrolysis unit in the electrolyzer 1 are cathode electrolysis units 5.

Carbon Desorption Test

In the embodiment, there are four anion exchange membranes. The center-to-center distance between electrodes of different polarities is 25 mm, and the electrode plates measure 82 mm×76 mm×3 mm (with an effective area of 82 mm×72 mm).

This embodiment operates with a current density of 200 A/m², a desorption temperature of 50° C., and a total operation time of 8 hours.

In the embodiment, a volume of liquid filled in each electrolysis unit is 300 mL.

The initial composition of the solution in the anode electrolysis unit comprises: organic amine carbon absorbent (ethylenediamine) 2 mol/L, potassium hydroxide 2 mol/L, potassium chloride 0.5 mol/L, zinc chloride 0.2 mol/L, $CO_2$ 0.5 loading (loading is a molar ratio of $CO_2$ to carbon absorbent).

The initial composition of the solution in the cathode electrolysis unit comprises: organic amine carbon absorbent (ethylenediamine) 2 mol/L, potassium hydroxide 2 mol/L, potassium chloride 0.5 mol/L, zinc chloride 0.7 mol/L, $CO_2$ 0.2 loading.

During the test, a peristaltic pump maintains the solution in a flowing state within each electrolysis unit, with a flow rate controlled at approximately 25 mL/min.

Test Results

Figure 10:
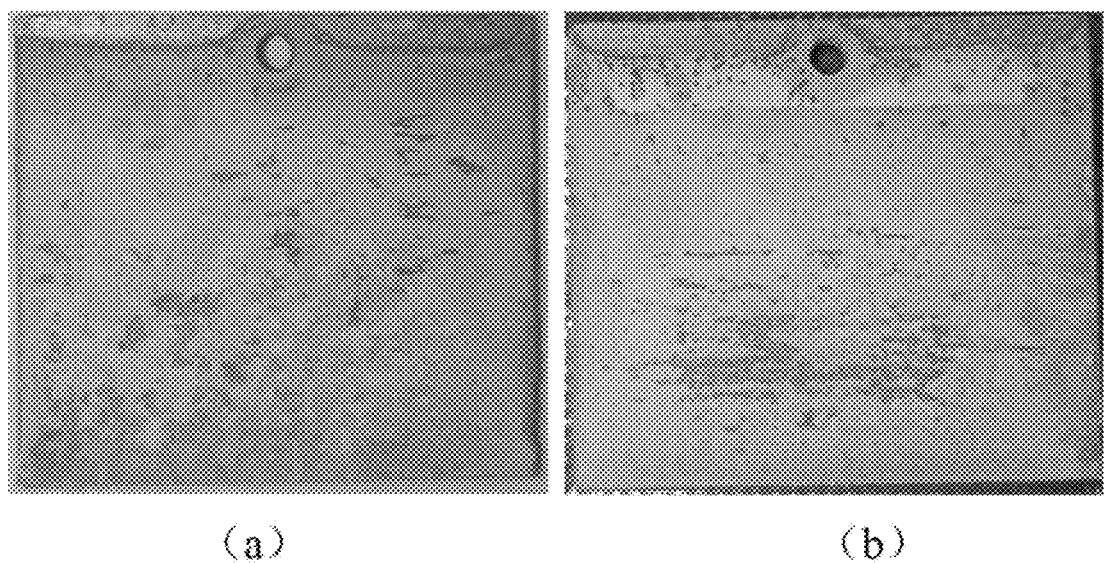
FIG. 10 is a state diagram of a positive electrode in Embodiment 1 of the present application after a carbon desorption test, where (a) represents the first side and (b) represents the second side.
Figure 11:
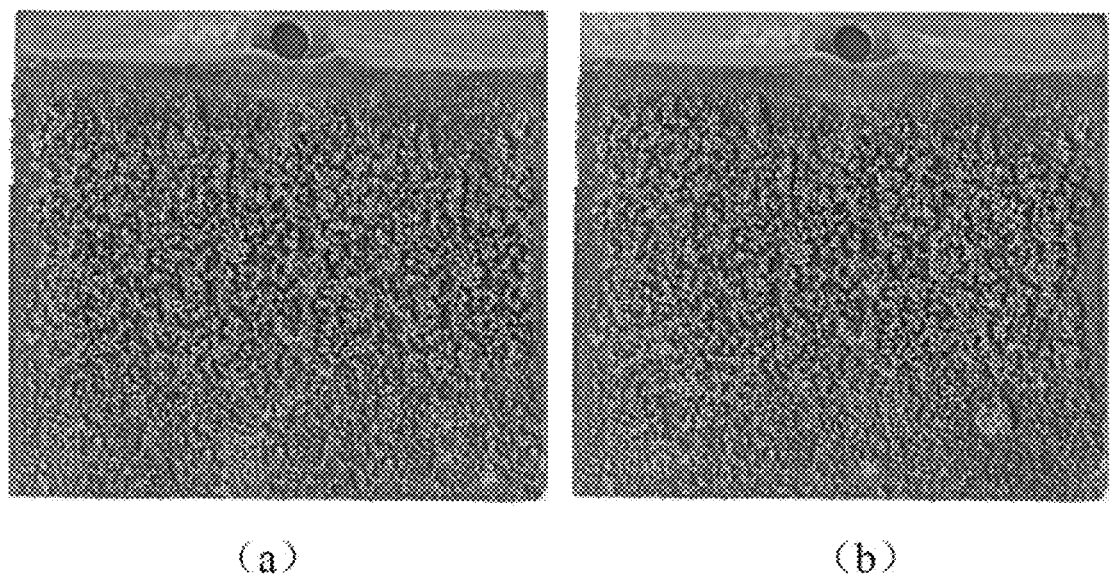
FIG. 11 is a state diagram of a negative electrode in Embodiment 1 of the present application after the carbon desorption test, where (a) represents the first side and (b) represents the second side.

As shown in FIGS. 10-11, the present embodiment achieves dual-sided dissolution of the positive electrode and dual-sided deposition of the negative electrode, and the uniformity of electrodeposition is significantly improved compared with a comparative embodiment 1. In the embodiment, the current efficiency is 96.77% and the power consumption is 184.58 kJ/mol $CO_2$.

Embodiment 2: A Bottom-In, Top-Out Carbon Desorption Device

In the embodiment, the carbon desorption device comprises an electrolyzer 1, which comprises a bottom wall, a first side wall, a second side wall, a third side wall, and a fourth side wall. The first and second side walls are positioned opposite one another, as are the third and fourth side walls.

The electrolyzer 1 is equipped with multiple anion exchange membranes 3, each attached and sealed to the bottom wall and the first and second side walls.

Each of the electrolysis units contains electrodes, with adjacent units having oppositely polarized electrodes. The electrolysis unit with the positive electrode 7 is the anode electrolysis unit 4, and the electrolysis unit with the negative electrode 6 is the cathode electrolysis unit 5. Along the arrangement direction of the anion exchange membrane 3, both the first electrolysis unit and the last electrolysis unit in the electrolyzer 1 are cathode electrolysis units 5.

Each anode electrolysis unit 4 is equipped with an anode liquid inlet 11 and an anode liquid outlet 9, while each cathode electrolysis unit 5 is equipped with a cathode liquid inlet 12 and a cathode liquid outlet 8. A bottom liquid outlet 10 is located at the bottom of each anode electrolysis unit 4 and cathode electrolysis unit 5. A cover is placed on a top of the electrolyzer 1, and the anion exchange membrane 3 is sealed and connected to this cover. The cover is equipped with an exhaust hole 2 at the position of each anode electrolysis unit 4, and the exhaust hole 2 is connected to the gas collection tank 19.

The anode liquid inlet 11 is located at a lower part of the anode electrolysis unit 4, and the cathode liquid inlet 12 is located at a lower part of the cathode electrolysis unit 5. The anode liquid outlet 9 is located at an upper part of the anode electrolysis unit 4, and the cathode liquid outlet 8 is located at an upper part of the cathode electrolysis unit 5. Both the anode liquid inlet 11 and the cathode liquid inlet 12 are located on the first side wall, and both the anode liquid outlet 9 and the cathode liquid outlet 8 are located on the second side wall.

Embodiment 3: A Top-In and Bottom-Out Carbon Desorption Device

Compared with embodiment 2, the present embodiment adjusts relative positions of the anode liquid inlet 11 and the anode liquid outlet 9, and relative positions of the cathode liquid inlet 12 and the cathode liquid outlet 8, and adds an overflow baffle 13 and an overflow chamber partition plate 14.

The specific adjustments of the present embodiment are as follows, except for the following adjustments, other settings are the same as settings of Embodiment 2.

Both the anode liquid inlet 11 and the anode liquid outlet 9 are located at the top of the anode electrolysis unit 4. Both the cathode liquid inlet 12 and the cathode liquid outlet 8 are located at the upper part of the cathode electrolysis unit 5.

The electrolyzer 1 is equipped with an overflow baffle 13, which is located between the first side wall and the second side wall. One side of the overflow baffle 13 extends to the third side wall and is sealed with the third side wall, while the other side of the overflow baffle 13 extends to the fourth side wall and is sealed with the fourth side wall. A liquid flow gap is formed between the overflow baffle 13 and the bottom wall. The top of the overflow baffle 13 is positioned above the levels of both the anode liquid inlet 11 and the cathode liquid inlet 12, and the top of the overflow baffle 13 extends to the top of the electrolyzer.

One side of each anion exchange membrane 3 is closely sealed with the overflow baffle 13, and the other side is closely sealed with the first side wall.

The electrolyzer 1 is equipped with an overflow chamber partition plate 14 corresponding to the anion exchange membrane 3. The anion exchange membrane 3 is sealed and connected to the second side wall by the overflow chamber partition plate 14, which is also sealedly arranged with the overflow baffle 13 and the second side wall, thereby forming an overflow chamber in each electrolysis unit. The upper end of the overflow chamber partition plate 14 is sealed and connected to the cover, and the lower end of the overflow chamber partition plate 14 is sealed and connected to the bottom wall.

Embodiment 4: A Carbon Desorption Device with $CO_2$-Lean Liquid Transfer Tank

Compared with embodiment 2 or embodiment 3, the present embodiment further comprises a $CO_2$-lean liquid transfer tank 17 on the basis of the embodiment 2 or embodiment 3.

The liquid inlet end of the $CO_2$-lean liquid transfer tank 17 is connected to the anode liquid outlet 9, and/or the liquid inlet end of the $CO_2$-lean liquid transfer tank 17 is connected to the bottom liquid outlet 10 of the anode electrolysis unit 4. The liquid outlet end of the $CO_2$-lean liquid transfer tank 17 is connected to the cathode liquid inlet 12.

Embodiment 5: A Carbon Desorption Device with Circulation Tank

Expanding upon the embodiments 2 and 3, this embodiment introduces both an anode liquid circulation tank 20 and a cathode liquid circulation tank 21.

The liquid inlet end of the anode liquid circulation tank 20 is connected to the anode liquid outlet 9, and the first liquid outlet end of the anode liquid circulation tank 20 is connected to the anode liquid inlet 11, and the second liquid outlet end of the anode liquid circulation tank 20 is connected to the first liquid inlet end of the cathode liquid circulation tank 21, and the liquid outlet end of the cathode liquid circulation tank 21 is connected to the cathode liquid inlet 12, and the second liquid inlet end of the cathode liquid circulation tank 21 is connected to the cathode liquid outlet 8.

The bottom liquid outlet 10 of the anode electrolysis unit 4 is connected to the anode liquid circulation tank 20, and the bottom liquid outlet 10 of the cathode electrolysis unit 5 is connected to the cathode liquid circulation tank 21.

Embodiment 6: A Carbon Capture System with $CO_2$-Lean Liquid Transfer Tank

Compared with embodiment 4, the present embodiment further comprises a carbon absorption device 15, a $CO_2$-rich liquid transfer tank 16 and an absorbent solution transfer tank 18 on the basis of embodiment 4.

The liquid inlet end of the $CO_2$-rich liquid transfer tank 16 is connected to the liquid outlet end of the carbon absorption device 15, and the liquid outlet end of the $CO_2$-rich liquid transfer tank 16 is connected to the $CO_2$-rich liquid receiving port of the modular membrane isolation carbon desorption device. The liquid inlet end of the absorbent solution transfer tank 18 is connected to the outlet of the absorbent solution in the modular membrane isolation carbon desorption device, and the liquid outlet end of the absorbent solution transfer tank 18 is connected to the liquid inlet end of the carbon absorption device 15.

In the embodiment, the $CO_2$-rich liquid receiving port of the modular membrane isolation carbon desorption device is located at each anode electrolysis unit 4. The $CO_2$-lean liquid receiving port of the modular membrane isolation carbon desorption device is located at the $CO_2$-lean liquid transfer tank 17. The outlet of the absorbent solution in the modular membrane isolation carbon desorption device is located at each cathode electrolysis unit 5 (such as the cathode liquid outlet 8 or the bottom liquid outlet 10 of the cathode electrolysis unit 5).

Embodiment 7: A Carbon Capture System with Circulation Tank

Beyond embodiment 5, the present embodiment further comprises a carbon absorption device 15, a $CO_2$-rich liquid transfer tank 16 and an absorbent solution transfer tank 18.

The liquid inlet end of the $CO_2$-rich liquid transfer tank 16 is connected to the liquid outlet end of the carbon absorption device 15, and the liquid outlet end of the $CO_2$-rich liquid transfer tank 16 is connected to the $CO_2$-rich liquid receiving port of the modular membrane isolation carbon desorption device. The absorbent solution transfer tank 18 has its inlet connected to the modular membrane isolation carbon desorption device's absorbent solution outlet, and its outlet connected to the carbon absorption device's 15 inlet.

In the embodiment, the $CO_2$-rich liquid receiving port of the modular membrane isolation carbon desorption device is located in the anode liquid circulation tank 20; the outlet of the absorbent solution in the modular membrane isolation carbon desorption device is located in the cathode liquid circulation tank 21.

Embodiment 8: An Intermittent Carbon Capture Process

The present embodiment uses the carbon capture system in embodiment 6 to capture $CO_2$.

During the first electrolysis process, a certain amount of $CO_2$-rich liquid is transferred from the anode liquid inlet 11 to the anode electrolysis unit 4. Simultaneously, the same volume of $CO_2$-lean liquid is transferred from the cathode liquid inlet 12 to the cathode electrolysis unit 5. At this time, all outlets—cathode liquid outlet 8, anode liquid outlet 9, and bottom liquid outlet 10—are closed.

Then, the positive electrode of the power supply is connected to the positive electrode 7, and the negative electrode of the power supply is connected to the negative electrode 6, initiating the $CO_2$ electrolysis process. During this process, the positive electrode 7 undergoes metal dissolution and simultaneously produces $CO_2$ and desorbed liquid, with the $CO_2$ continuously discharged from the exhaust holes 2 to the gas collection tank 19. Meanwhile, the negative electrode 6 undergoes metal deposition and simultaneously generates an absorbent solution. Upon completion of the electrolysis process, the $CO_2$-lean liquid and the absorbent solution are discharged from the bottom liquid outlet 10 to their respective transfer tanks ($CO_2$-lean liquid transfer tank 17, absorbent solution transfer tank 18). The $CO_2$-lean liquid is then reused as the cathode liquid for the next cycle, and the absorbent solution is transported to an absorption tower for $CO_2$ absorption.

During the second electrolysis process, the $CO_2$-rich liquid and the $CO_2$-lean liquid are simultaneously transferred from the anode liquid inlet 11 and the cathode liquid inlet 12 to the anode electrolysis unit 4 and the cathode electrolysis unit 5, respectively; the anode liquid outlet 9, the cathode liquid outlet 8 and the bottom liquid outlet 10 are closed; after the supply power is turned on, $CO_2$ desorption commences.

This facilitates multiple multi-tank electrochemical desorption cycles. Throughout these cycles, the plates and membranes may be replaced as necessary to sustain the electrochemical desorption process.

Embodiment 9: A Continuous Fluidized Carbon Capture Method

The present embodiment uses the carbon capture system in embodiment 6 to capture $CO_2$.

When starting, the anode electrolysis unit 4 and the cathode electrolysis unit 5 are first filled with $CO_2$-rich liquid and $CO_2$-lean liquid respectively (the bottom liquid outlet 10 is closed). The $CO_2$-rich liquid transfer tank 16 remains connected to the anode electrolysis unit 4, and the $CO_2$-rich liquid is transferred from the anode liquid inlet 11 to the anode electrolysis unit 4 by a pipeline. The anode liquid outlet 9 is connected to the $CO_2$-lean liquid transfer tank 17, and the $CO_2$-lean liquid transfer tank 17 is connected to the cathode liquid inlet 12, so that the $CO_2$-lean liquid generated in the anode electrolysis unit 4 can be transferred from the $CO_2$-lean liquid transfer tank 17 to the cathode liquid inlet 12 by the pipeline and then enter into the cathode electrolysis unit 5. The cathode liquid outlet 8 is connected to the absorbent solution transfer tank 18. The positive pole of the power supply is connected to the positive electrode 7, and the negative pole of the power supply is connected to the negative electrode 6, and the electrolysis process of the $CO_2$ is continuously carried out.

During the electrolysis process, the positive electrode 7 undergoes metal dissolution and simultaneously produces the $CO_2$ and the desorbed liquid, while the negative electrode 6 undergoes metal deposition and simultaneously generates the absorbent solution. The $CO_2$-rich liquid is converted into the $CO_2$-lean liquid in the anode electrolysis unit 4, and the $CO_2$-lean liquid enters the $CO_2$-lean liquid transfer tank 17 by the anode liquid outlet 9, and then enters the cathode electrolysis unit 5 by the cathode liquid inlet 12. The $CO_2$-lean liquid is converted into the absorbent solution in the cathode electrolysis unit 5, and the absorbent solution enters the absorbent solution transfer tank 18 by the cathode liquid outlet 8 and returns to the carbon absorption device 15.

The electrochemical desorption is simultaneously conducted across multiple tanks. During these operations, the plates and membranes may be replaced as needed to maintain the continuity of the electrochemical desorption process.

Embodiment 10: A Fluidized Intermittent Carbon Capture Method

The present embodiment uses the carbon capture system in embodiment 7 to capture the $CO_2$.

During the first electrolysis process, the $CO_2$-rich liquid is first sent to the $CO_2$-rich liquid transfer tank 16, and then sent to the anode liquid circulation tank 20, and at the same time, the same volume of $CO_2$-lean liquid is prepared or obtained and then placed in the cathode liquid circulation tank 21; then, the $CO_2$-rich liquid is simultaneously sent from the anode liquid inlet 11 to the anode electrolysis unit 4, and the $CO_2$-lean liquid is sent from the cathode liquid inlet 12 to the cathode electrolysis unit 5, and only the bottom liquid outlet 10 is closed. When a volume of the solution increases to a certain extent, the solution (anode liquid) in the anode electrolysis unit 4 will overflow from the anode liquid outlet 9 and return to the anode liquid circulation tank 20, and the solution (cathode liquid) in the cathode electrolysis unit 5 will overflow from the cathode liquid outlet 8 and return to the cathode liquid circulation tank 21, and a circulation is repeated in this way.

Then, the positive electrode of the power supply is connected to the positive electrode 7, and the negative electrode of the power supply is connected to the negative electrode 6, initiating the $CO_2$ electrolysis process. During the electrolysis process, the positive electrode 7 undergoes metal dissolution and simultaneously produces the $CO_2$ and the desorbed liquid, and the $CO_2$ is continuously discharged from the exhaust hole 2 to the gas collection tank 19; and the negative electrode 6 undergoes metal deposition and simultaneously generates the absorbent solution. After the electrolysis process is completed, the solution in the anode liquid circulation tank 20 is completely converted into the $CO_2$-lean liquid, and the solution in the cathode liquid circulation tank 21 is completely converted into the absorbent solution. The $CO_2$-lean liquid is used as the cathode liquid for the next time, and the absorbent solution is sent to the carbon absorption device 15 to absorb the $CO_2$.

During the second electrolysis process, the liquid in the electrolyzer 1 is discharged to corresponding circulation tank by the bottom liquid outlet 10; then, the absorbent solution in the cathode liquid circulation tank 21 is all sent to the absorbent solution transfer tank 18, and the $CO_2$-lean liquid in the anode liquid circulation tank 20 is transferred to the cathode liquid circulation tank 21, and the $CO_2$-rich liquid is transferred from the $CO_2$-rich liquid transfer tank 16 to the anode liquid circulation tank 20. After the power supply is turned on, the desorption of the $CO_2$ can be carried out.

This approach enables multiple multi-tank electrochemical desorption cycles, with electrode plates and membranes being replaceable based on their condition to sustain the desorption process. Additionally, modularization allows for rapid scalability according to processing volume requirements.

Comparative Embodiment 1: A Conventional Carbon Desorption Device

The desorption device comprises an electrolyzer, which comprises a positive electrode, a negative electrode, and an anion exchange membrane. The positive electrode (anode plate made of zinc) and the negative electrode (cathode plate made of zinc) are segregated by the anion exchange membrane, creating an anode chamber and a cathode chamber.

Carbon Desorption Test

In the comparative embodiment 1, the number of the anion exchange membranes is 1, with a center-to-center distance between electrodes of 25 mm. The electrode plates measure 82 mm×76 mm×3 mm, with an effective area of 82 mm×72 mm.

In the comparative embodiment 1, the current density is 200 A/m$^2$, the desorption temperature is 50° C., and the operation time is 8 h.

In the comparative embodiment 1, the volume of liquid filled in the anode chamber and the cathode chamber is 300 mL, respectively.

The initial composition of the anode chamber solution comprises: 2 mol/L organic amine carbon absorbent (ethylenediamine), 2 mol/L potassium hydroxide, 0.5 mol/L potassium chloride, 0.2 mol/L of zinc chloride, and a $CO_2$ loading of 0.5.

The initial composition of the solution of the cathode chamber comprises: 2 mol/L organic amine carbon absorbent (ethylenediamine), 2 mol/L potassium hydroxide, 0.5 mol/L potassium chloride, 0.7 mol/L zinc chloride, $CO_2$ loading of 0.2.

During the experiment, a peristaltic pump was utilized to maintain a flow state in each chamber, with the flow rate regulated at approximately 25 mL/min.

Test Results

Figure 12:
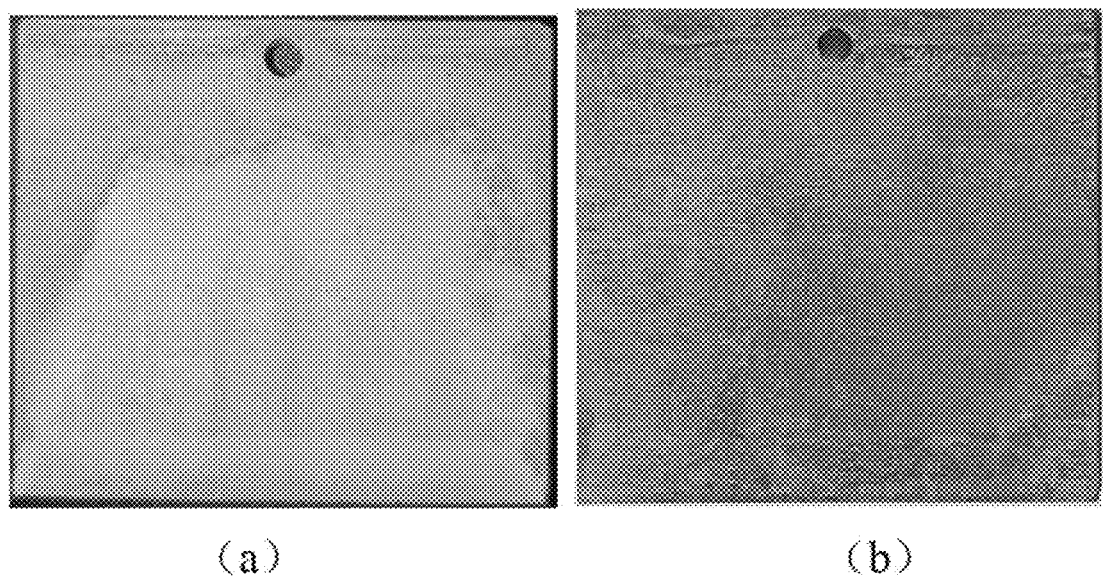
FIG. 12 is a state diagram of the positive electrode in Comparative embodiment 1 of the present application after the carbon desorption test, where (a) represents the first side and (b) represents the second side.
Figure 13:
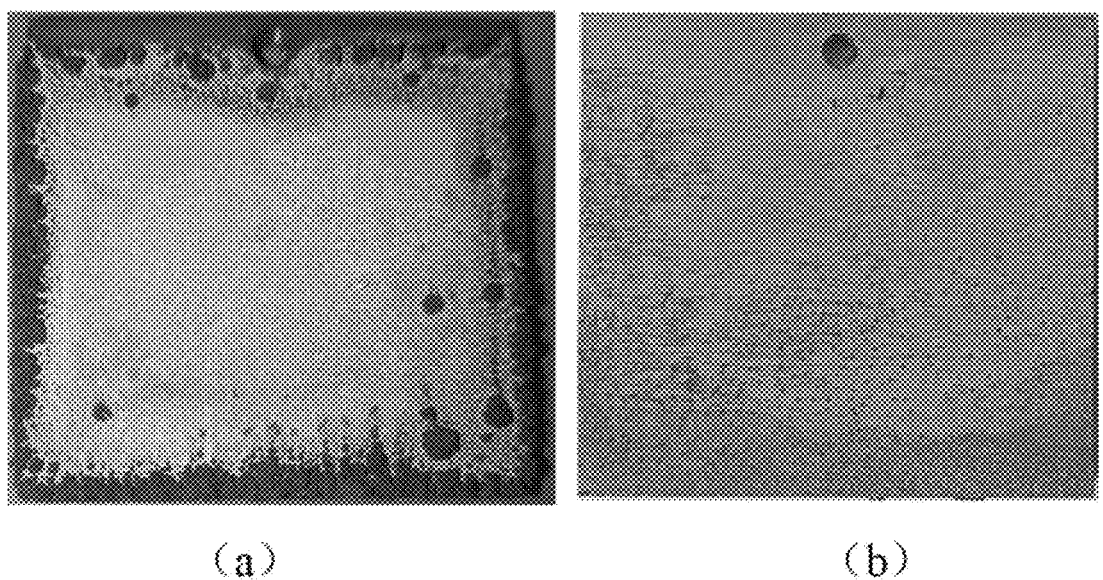
FIG. 13 is a state diagram of the negative electrode in Comparative embodiment 1 of the present application after the carbon desorption test, where (a) represents the first side and (b) represents the second side.

As depicted in FIGS. 12-13, in the comparative embodiment, electrolytic dissolution predominantly takes place on the first side of the positive electrode (facing the negative electrode), while electrodeposition primarily occurs on the first side of the negative electrode (facing the positive electrode). The uniformity of electro-dissolution and electro-deposition is notably poor. In this comparative embodiment, the current efficiency is 93.25%, and the power consumption is 214.05 kJ/mol $CO_2$.

The technical solutions presented herein are merely preferred embodiments of the present application, and the patent scope of the present application is not restricted to these specific embodiments. Any equivalent structural modifications made by utilizing the contents of the specification and drawings under the technical concept of the present application, whether directly or indirectly applied in other related technical fields, are encompassed within the patent protection scope of the present application.

What is claimed is:
1. A carbon capture system comprising:
a carbon absorption device;

a modular membrane isolation carbon desorption device comprising an electrolyzer, wherein the electrolyzer comprises a bottom wall, a first side wall and a second side wall, and the first side wall and the second side wall are positioned opposite each other;

the electrolyzer comprises a plurality of anion exchange membranes, and the plurality of anion exchange membranes are simultaneously sealed and connected to the bottom wall, the first side wall, and the second side wall; and the electrolyzer is divided into a plurality of electrolysis units by the plurality of anion exchange membranes;

each of the plurality of electrolysis units contains electrodes, and the polarities of the electrodes in adjacent electrolysis units are opposite; and one of the plurality of electrolysis units with a positive electrode is an anode electrolysis unit, and one of the plurality of electrolysis units with a negative electrode is a cathode electrolysis unit.

2. The carbon capture system according to claim 1, wherein, oriented along the arrangement of the plurality of anion exchange membranes, both a first electrolysis unit and a last electrolysis unit within the electrolyzer function as cathode electrolysis units.

3. The carbon capture system according to claim 1, wherein the anode electrolysis unit comprises an anode liquid inlet and an anode liquid outlet, and the cathode electrolysis unit comprises a cathode liquid inlet and a cathode liquid outlet;

the anode electrolysis unit and the cathode electrolysis unit are equipped with a bottom liquid outlet;

a top of the electrolyzer is equipped with a cover, and the plurality of anion exchange membranes are sealed and connected to the cover;

the anode electrolysis unit comprises an exhaust hole located above both the anode liquid inlet and outlet.

4. The carbon capture system according to claim 3, wherein the modular membrane isolation carbon desorption device further comprises a $CO_2$-lean liquid transfer tank;

the $CO_2$-lean liquid transfer tank's liquid inlet is connected to the anode liquid outlet, and/or to the bottom liquid outlet of the anode electrolysis unit; and a liquid outlet end of the $CO_2$-lean liquid transfer tank is connected to the cathode liquid inlet.

5. The carbon capture system according to claim 3, wherein the modular membrane isolation carbon desorption device further comprises an anode liquid circulation tank and a cathode liquid circulation tank;

a liquid inlet end of the anode liquid circulation tank is connected to the anode liquid outlet, and a first liquid outlet end of the anode liquid circulation tank is connected to the anode liquid inlet, and a second liquid outlet end of the anode liquid circulation tank is connected to the first liquid inlet end of the cathode liquid circulation tank, and a liquid outlet end of the cathode liquid circulation tank is connected to the cathode liquid inlet, and a second liquid inlet end of the cathode liquid circulation tank is connected to the cathode liquid outlet.

6. The carbon capture system according to claim 3, wherein the modular membrane isolation carbon desorption device further comprises a liquid channel assembly; and the liquid channel assembly comprises a liquid inlet pipeline of the anode electrolysis unit, a liquid outlet pipeline of the anode electrolysis unit, a liquid inlet pipeline of the cathode electrolysis unit and a liquid outlet pipeline of the cathode electrolysis unit;

the anode liquid inlet is connected to the liquid inlet pipeline of the anode electrolysis unit, and the anode liquid outlet is connected to the liquid outlet pipeline of the anode electrolysis unit, and the cathode liquid inlet is connected to the liquid inlet pipeline of the cathode electrolysis unit, and the cathode liquid outlet is connected to the liquid outlet pipeline of the cathode electrolysis unit.

7. The carbon capture system according to claim 3, wherein the anode liquid inlet is located at a lower part of the anode electrolysis unit, and the cathode liquid inlet is located at a lower part of the cathode electrolysis unit;

the anode liquid outlet is located at an upper part of the anode electrolysis unit, and the cathode liquid outlet is located at an upper part of the cathode electrolysis unit.

8. The carbon capture system according to claim 3, wherein both the anode liquid inlet and the anode liquid outlet are located at an upper part of the anode electrolysis unit, and both the cathode liquid inlet and the cathode liquid outlet are located at an upper part of the cathode electrolysis unit.

9. The carbon capture system according to claim 8, wherein both the anode liquid inlet and the cathode liquid inlet are located on the first side wall, and both the anode liquid outlet and the cathode liquid outlet are located on the second side wall;

the electrolyzer further comprises a third side wall and a fourth side wall, and the third wall and the fourth side wall are positioned opposite each other, and an overflow baffle is installed in the electrolyzer;

the overflow baffle is located between the first side wall and the second side wall; one side of the overflow baffle extends to the third side wall, while the other side extends to the fourth side wall; a liquid flow gap is located between the overflow baffle and the bottom wall; a top of the overflow baffle is positioned above the levels of both the anode liquid inlet and the cathode liquid inlet;

one side of each of the plurality of anion exchange membrane is sealed against the overflow baffle, while the opposing side is sealed against the first side wall;

the electrolyzer further comprises an overflow chamber partition plate corresponding to an anion exchange membrane, the anion exchange membrane is sealed and connected to the second side wall by the overflow chamber partition plate, thereby forming an overflow chamber in each of the plurality of electrolysis units; an upper end of the overflow chamber partition plate is sealed and connected to the cover, and a lower end of the overflow chamber partition plate is sealed and connected to the bottom wall.

10. The carbon capture system according to claim 1, wherein the carbon capture system further comprises a $CO_2$-rich liquid transfer tank and an absorbent solution transfer tank; a liquid inlet end of the $CO_2$-rich liquid transfer tank is connected to a liquid outlet end of the carbon absorption device, and a liquid outlet end of the $CO_2$-rich liquid transfer tank is connected to a $CO_2$-rich liquid receiving port of the modular membrane isolation carbon desorption device;

a liquid inlet end of the absorbent solution transfer tank is connected to an outlet of the absorbent solution in the modular membrane isolation carbon desorption device, and a liquid outlet end of the absorbent solution transfer tank is connected to a liquid inlet end of the carbon absorption device.

11. An intermittent carbon capture method based on a carbon capture system according to claim 1, comprising:
absorbing $CO_2$ gas by an absorbent solution to obtain a $CO_2$-rich liquid, the absorbent solution containing a carbon absorbent, wherein the $CO_2$-rich liquid contains compounds formed by $CO_2$ and the carbon absorbent;
performing a desorption operation on the $CO_2$-rich liquid by a modular membrane isolation carbon desorption device, wherein the desorption operation comprises at least one electrolysis operation, wherein the electrolysis operation comprises:
transferring the $CO_2$-rich liquid to an anode electrolysis unit, and transferring a $CO_2$-lean liquid to a cathode electrolysis unit, wherein the $CO_2$-lean liquid contains coordination compounds formed by the carbon absorbent and metal ions; performing a first electrolysis operation on the anode electrolysis unit and the cathode electrolysis unit, after which the $CO_2$-rich liquid in the anode electrolysis unit is converted into a $CO_2$-lean liquid and the $CO_2$ gas, and the $CO_2$-lean liquid in the cathode electrolysis unit is converted into the absorbent solution;
after completing the first electrolysis operation, discharging the $CO_2$-lean liquid in the anode electrolysis unit and the absorbent solution in the cathode electrolysis unit;
transferring the $CO_2$-lean liquid from the anode electrolysis unit to the cathode electrolysis unit, and transferring the $CO_2$-rich liquid to the anode electrolysis unit, wherein a second electrolysis operation is performed on the anode electrolysis unit and the cathode electrolysis unit, wherein after the second electrolysis operation, the $CO_2$-rich liquid in the anode electrolysis unit is converted into the $CO_2$-lean liquid and the $CO_2$ gas, and the $CO_2$-lean liquid in the cathode electrolysis unit is converted into the absorbent solution;
after completing the second electrolysis operation, discharging the $CO_2$-lean liquid in the anode electrolysis unit and the absorbent solution in the cathode electrolysis unit.

12. A continuous fluidized carbon capture method based on a carbon capture system according to claim 1, comprising:
absorbing $CO_2$ gas by an absorbent solution to obtain a $CO_2$-rich liquid, wherein the absorbent solution contains a carbon absorbent and the $CO_2$-rich liquid contains compounds formed by $CO_2$ and the carbon absorbent;
performing a desorption operation on the $CO_2$-rich liquid by a modular membrane isolation carbon desorption device, wherein the desorption operation comprises:
continuously transferring the $CO_2$-rich liquid to an anode electrolysis unit for anode electrolysis, and converting the $CO_2$-rich liquid into a $CO_2$-lean liquid in the anode electrolysis unit and releasing the $CO_2$ gas, wherein the $CO_2$-lean liquid contains coordination compounds formed by the carbon absorbent and metal ions;
during an anode electrolysis process, continuously transferring the $CO_2$-lean liquid generated in the anode electrolysis unit to the cathode electrolysis unit for cathode electrolysis, wherein the $CO_2$-lean liquid electrodeposited in the cathode electrolysis unit is converted to the absorbent solution.

13. A fluidized intermittent carbon capture method based on the carbon capture system according to claim 1, comprising:
absorbing $CO_2$ gas by an absorbent solution to obtain a $CO_2$-rich liquid, wherein the absorbent solution contains a carbon absorbent, and the $CO_2$-rich liquid contains compounds formed by $CO_2$ and the carbon absorbent;
performing a desorption operation on the $CO_2$-rich liquid by a modular membrane isolation carbon desorption device, wherein the desorption operation comprises a cyclic electrolysis operation and a liquid replacement operation;
the cyclic electrolysis operation comprising: continuously transferring the $CO_2$-rich liquid from an anode liquid circulation tank to an anode electrolysis unit for anode electrolysis to convert the $CO_2$-rich liquid into a $CO_2$-lean liquid and release $CO_2$ gas, wherein the $CO_2$-lean liquid contains coordination compounds formed by the carbon absorbent and metal ions; during the anode electrolysis process, the liquid within the anode electrolysis unit being refluxed to the anode liquid circulation tank, while simultaneously transferring more liquid from said tank back to the anode electrolysis unit, thereby converting the $CO_2$-rich liquid to the $CO_2$-lean liquid;
continuously transferring the $CO_2$-lean liquid from a cathode liquid circulation tank to a cathode electrolysis unit for cathode electrolysis to achieve electrodeposition of metal ions and convert the $CO_2$-lean liquid into the absorbent solution; during a cathode electrolysis process, refluxing the liquid from the cathode electrolysis unit to the cathode liquid circulation tank and continuously conveying it to the cathode electrolysis unit, thereby completely converting the $CO_2$-lean liquid into the absorbent solution;
the liquid replacement operation comprising: after completing the cyclic electrolysis operation, discharging the absorbent solution produced in the cathode liquid circulation tank;
transferring the $CO_2$-lean liquid produced in the anode liquid circulation tank to the cathode liquid circulation tank; and injecting the $CO_2$-rich liquid into the anode liquid circulation tank.

14. An application for capturing $CO_2$ by a modular membrane isolation carbon desorption device comprising performing a desorption operation on a $CO_2$-rich liquid, wherein the modular membrane isolation carbon desorption device comprises an electrolyzer; the electrolyzer comprises a bottom wall, a first side wall and a second side wall, and the first side wall and the second side wall are positioned opposite each other; the electrolyzer is equipped with a plurality of anion exchange membranes, and the plurality of anion exchange membranes are simultaneously sealed and connected to the bottom wall, the first side wall, and the second side wall; and the electrolyzer is divided into a plurality of electrolysis units by the plurality of anion exchange membranes; each of the plurality of electrolysis units is equipped with electrodes, and polarities of the electrodes in adjacent electrolysis units are opposite, wherein one of the plurality of electrolysis units with a positive electrode is an anode electrolysis unit, and one of the plurality of electrolysis units with a negative electrode is a cathode electrolysis unit; wherein the desorption operation comprises transferrin $CO_2$-rich liquid to the anode electrolysis unit, performing electrolysis operation on the anode electrolysis unit after which the $CO_2$-rich liquid in the anode electrolysis unit is converted into a $CO_2$-lean liquid and a $CO_2$ gas, and transferrin a $CO_2$-lean liquid to the cathode electrolysis unit, performing an electrolysis operation on the cathode electrolysis unit after which and the $CO_2$-lean liquid in the cathode electrolysis unit is converted into an absorbent solution.

15. The application according to claim 14, wherein along an arrangement direction of the plurality of anion exchange membranes, both a first electrolysis unit and a last electrolysis unit in the electrolyzer are cathode electrolysis units.

16. The application according to claim 14, wherein the anode electrolysis unit is equipped with an anode liquid inlet and an anode liquid outlet, and the cathode electrolysis unit is equipped with a cathode liquid inlet and a cathode liquid outlet;
- both the anode electrolysis unit and the cathode electrolysis unit are equipped with a bottom liquid outlet at their bases;
- a top of the electrolyzer is equipped with a cover, and the plurality of anion exchange membranes are sealed and connected to the cover;
- the anode electrolysis unit is further provided with an exhaust hole, and the exhaust hole is positioned above the levels of both the anode liquid inlet and the anode liquid outlet.

17. The application according to claim 16, wherein the modular membrane isolation carbon desorption device further comprises a $CO_2$-lean liquid transfer tank;
- the $CO_2$-lean liquid transfer tank's liquid inlet is connected to the anode liquid outlet, and/or to the bottom liquid outlet of the anode electrolysis unit; a liquid outlet end of the $CO_2$-lean liquid transfer tank is connected to the cathode liquid inlet.

18. The application according to claim 16, wherein the modular membrane isolation carbon desorption device further comprises an anode liquid circulation tank and a cathode liquid circulation tank;
- a liquid inlet end of the anode liquid circulation tank is connected to the anode liquid outlet, a first liquid outlet end of the anode liquid circulation tank is connected to the anode liquid inlet, a second liquid outlet end of the anode liquid circulation tank is connected to the first liquid inlet end of the cathode liquid circulation tank, a liquid outlet end of the cathode liquid circulation tank is connected to the cathode liquid inlet, and a second liquid inlet end of the cathode liquid circulation tank is connected to the cathode liquid outlet.

19. The application according to claim 16, wherein the modular membrane isolation carbon desorption device further comprises a liquid channel assembly, and the liquid channel assembly comprises a liquid inlet pipeline of the anode electrolysis unit, a liquid outlet pipeline of the anode electrolysis unit, a liquid inlet pipeline of the cathode electrolysis unit and a liquid outlet pipeline of the cathode electrolysis unit;
- the anode liquid inlet connects to the liquid inlet pipeline of the anode electrolysis unit, the anode liquid outlet connects to the liquid outlet pipeline of the anode electrolysis unit, the cathode liquid inlet connects to the liquid inlet pipeline of the cathode electrolysis unit, and the cathode liquid outlet connects to the liquid outlet pipeline of the cathode electrolysis unit.

20. The application according to claim 16, wherein the anode liquid inlet is located at a lower part of the anode electrolysis unit, and the cathode liquid inlet is located at a lower part of the cathode electrolysis unit;
- the anode liquid outlet is located at an upper part of the anode electrolysis unit; and the cathode liquid outlet is located at an upper part of the cathode electrolysis unit; or
- both the anode liquid inlet and the anode liquid outlet are located at an upper part of the anode electrolysis unit, and both the cathode liquid inlet and the cathode liquid outlet are located at an upper part of the cathode electrolysis unit.

21. The application according to claim 20, wherein both the anode liquid inlet and the cathode liquid inlet are located on the first side wall, and both the anode liquid outlet and the cathode liquid outlet are located on the second side wall;
- the electrolyzer further comprises a third side wall and a fourth side wall, which are positioned opposite each other, and an overflow baffle is installed in the electrolyzer;
- the overflow baffle is located between the first side wall and the second side wall; one side of the overflow baffle extends towards the third side wall while the opposite side extends towards the fourth side wall; a liquid flow gap exists between the overflow baffle and the bottom wall; and the top of the overflow baffle is positioned above the levels of both the anode liquid inlet and the cathode liquid inlet;
- one side of each of the plurality of anion exchange membranes is sealed with the overflow baffle, and the other side is sealed with the first side wall;
- the electrolyzer is equipped with an overflow chamber partition plate corresponding to an anion exchange membrane, the anion exchange membrane is sealed and connected to the second side wall by the overflow chamber partition plate, forming an overflow chamber in each of the plurality of electrolysis units; an upper end of the overflow chamber partition plate is sealed and connected to the cover, and a lower end of the overflow chamber partition plate is sealed and connected to the bottom wall.

* * * * *